July 2, 1957 W. G. ROWELL 2,798,213
CHECKING TECHNIQUE AND SYSTEM
Filed Aug. 19, 1953 12 Sheets-Sheet 1

INVENTOR.
WILLIAM G. ROWELL
BY *Rines and Rines*
ATTORNEYS

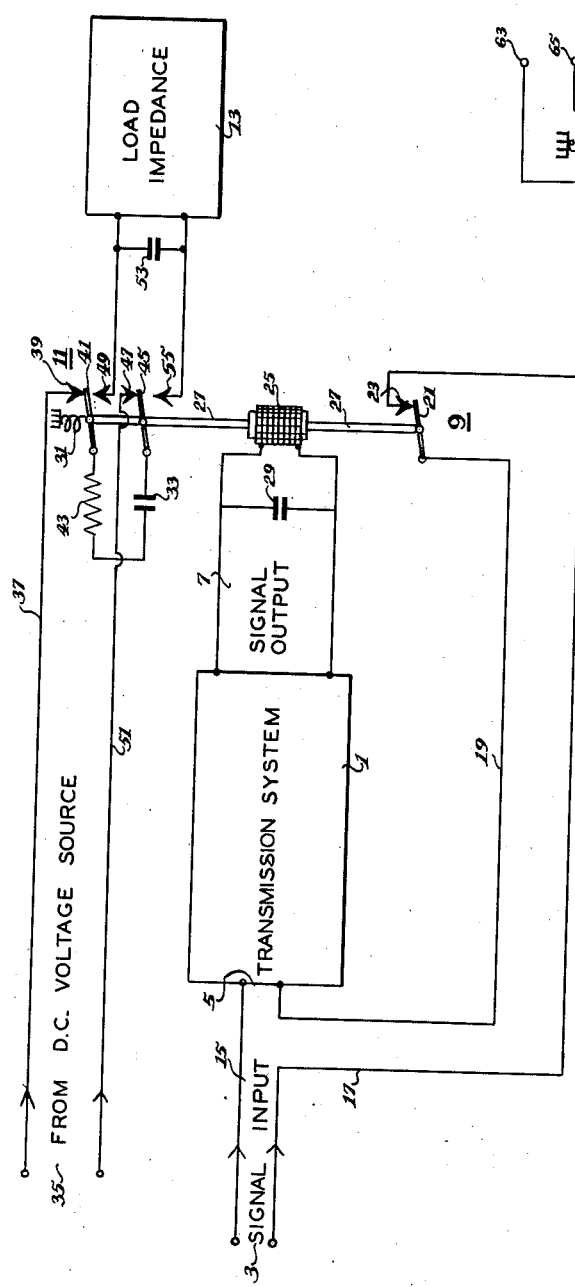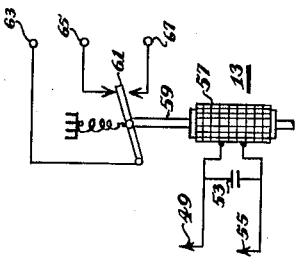

July 2, 1957
W. G. ROWELL
2,798,213
CHECKING TECHNIQUE AND SYSTEM
Filed Aug. 19, 1953
12 Sheets-Sheet 3
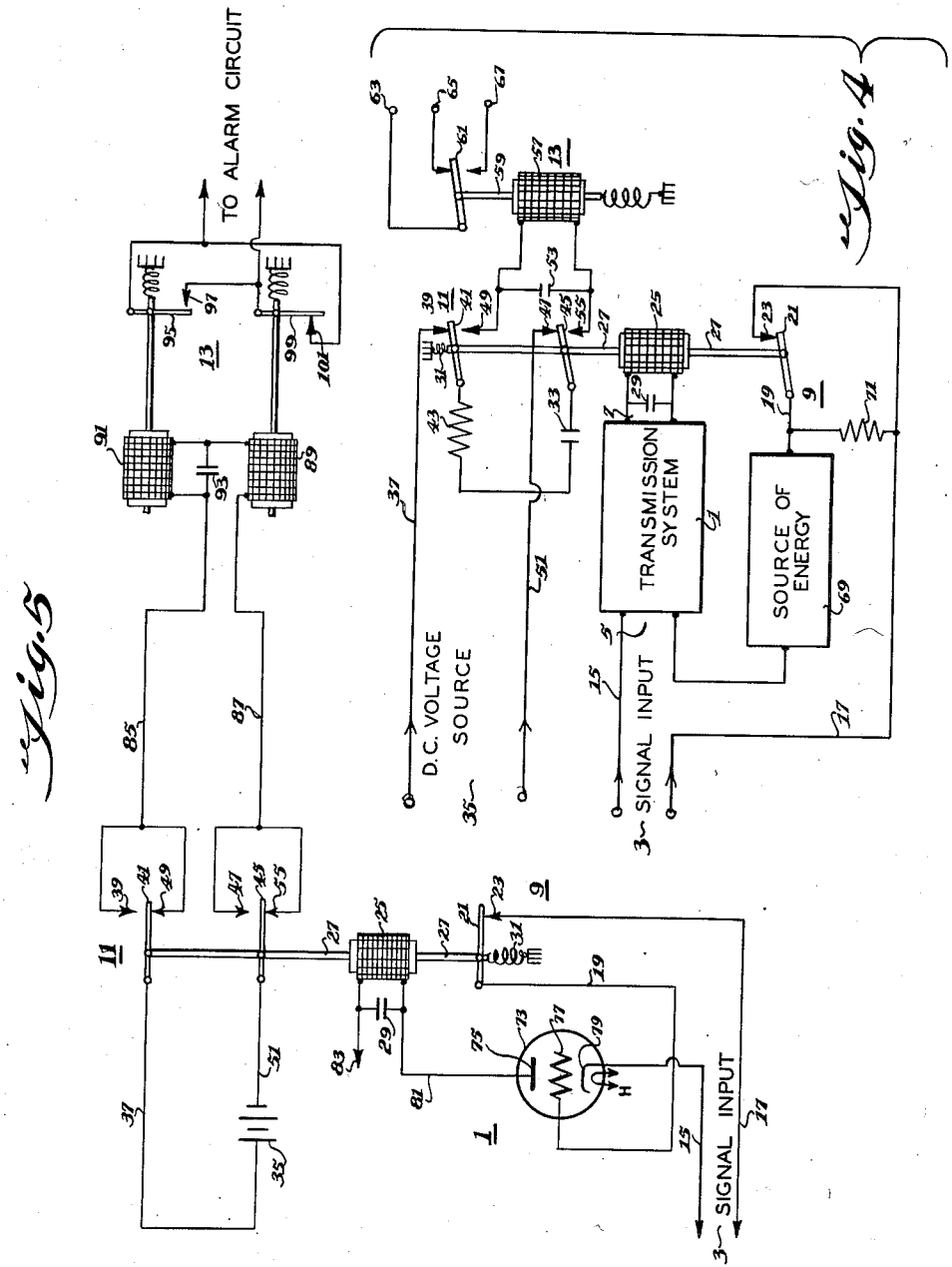
INVENTOR.
WILLIAM G. ROWELL
BY Rines and Rines
ATTORNEYS INVENTOR.
WILLIAM G. ROWELL
BY Rines and Rines
ATTORNEYS

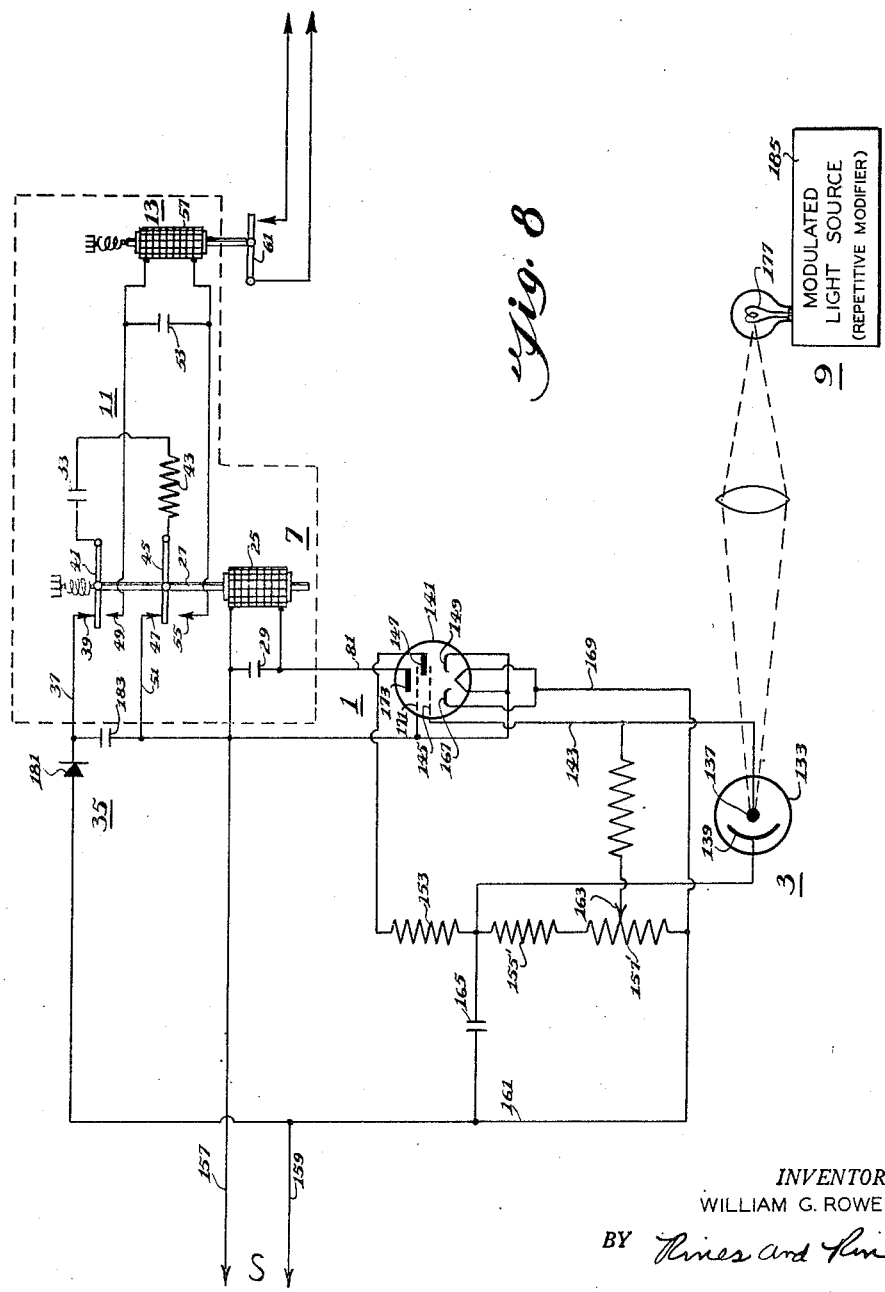

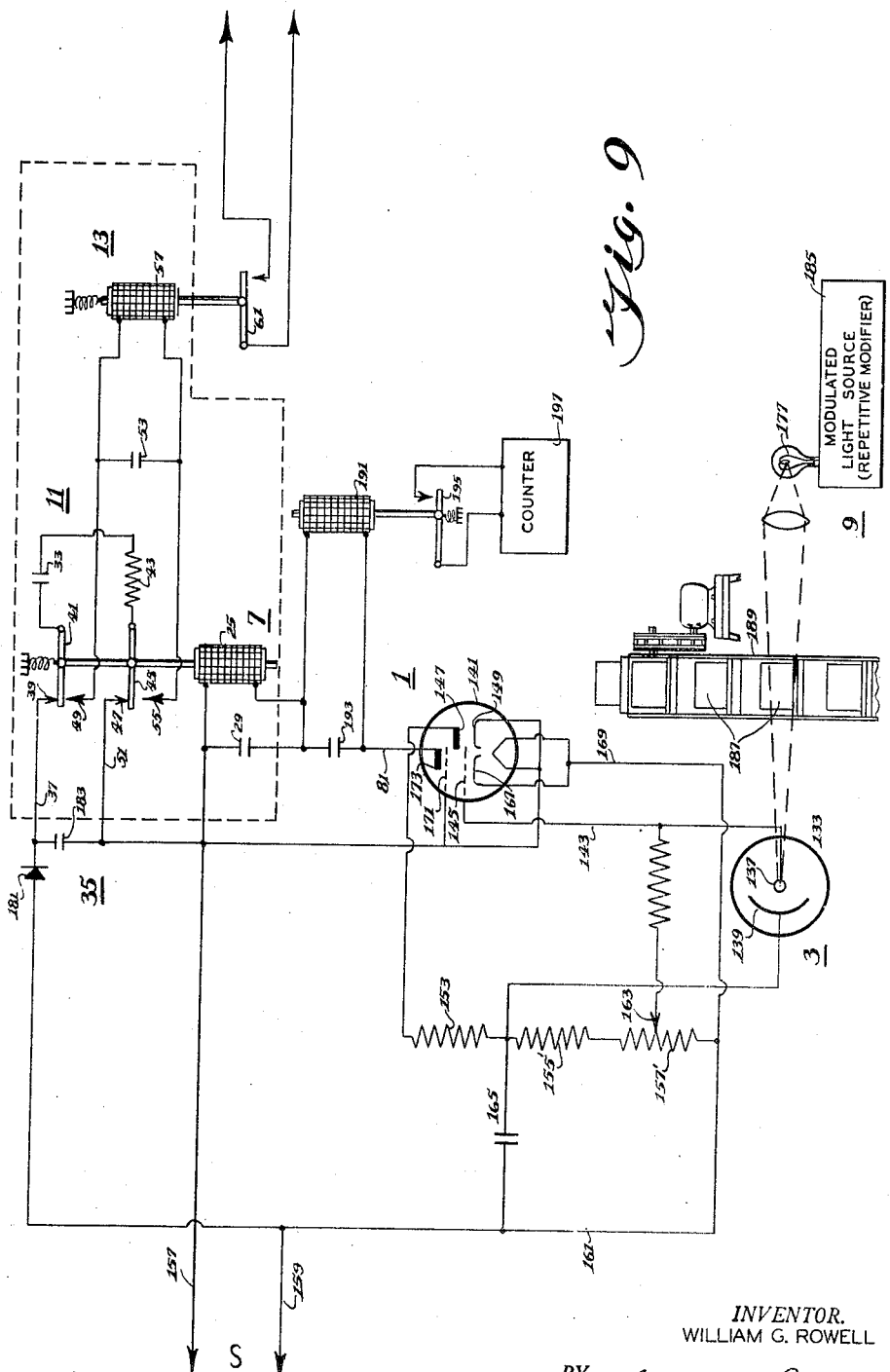

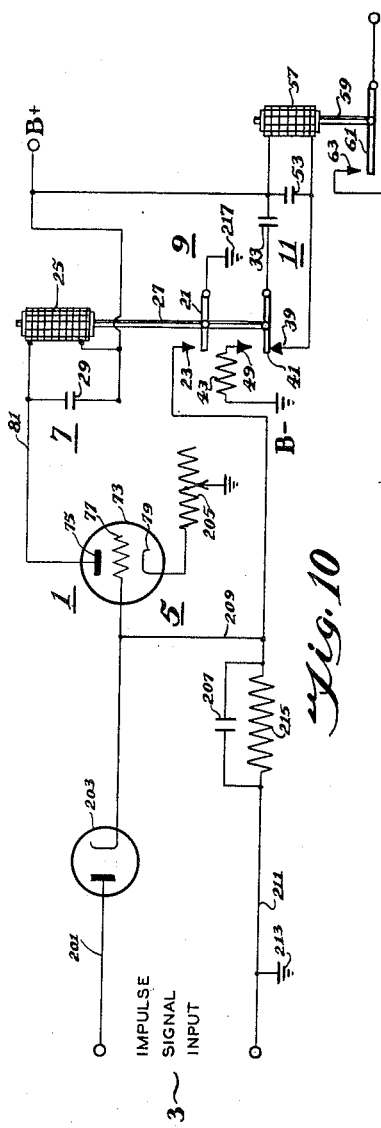

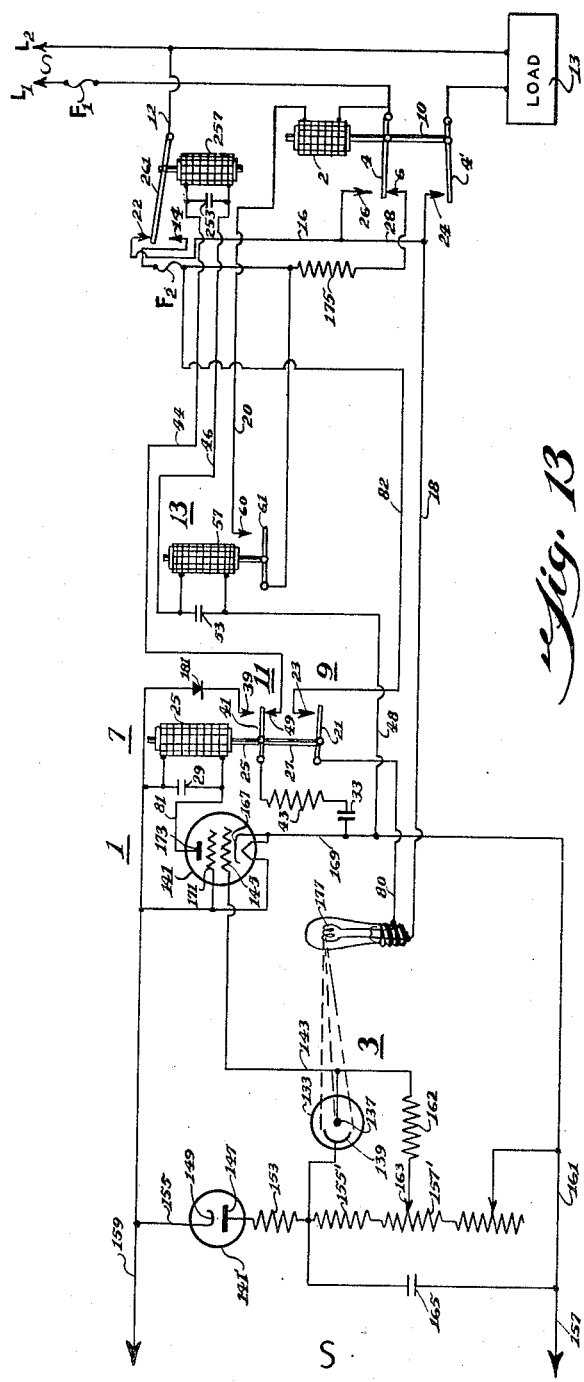
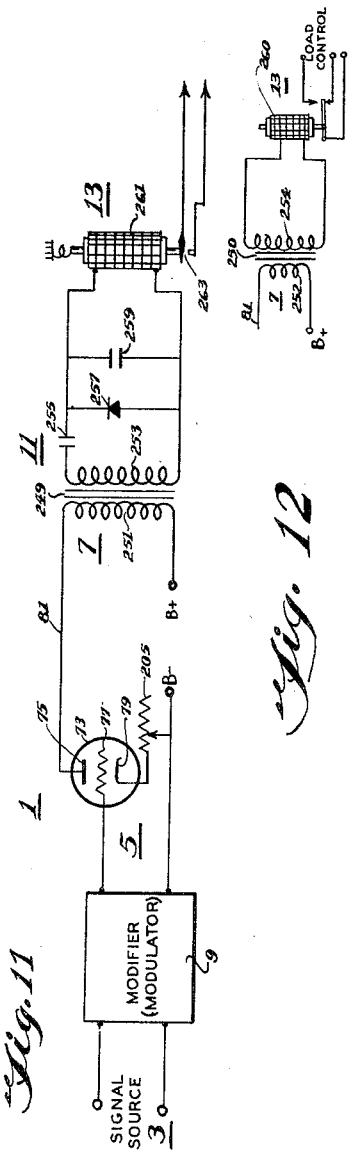

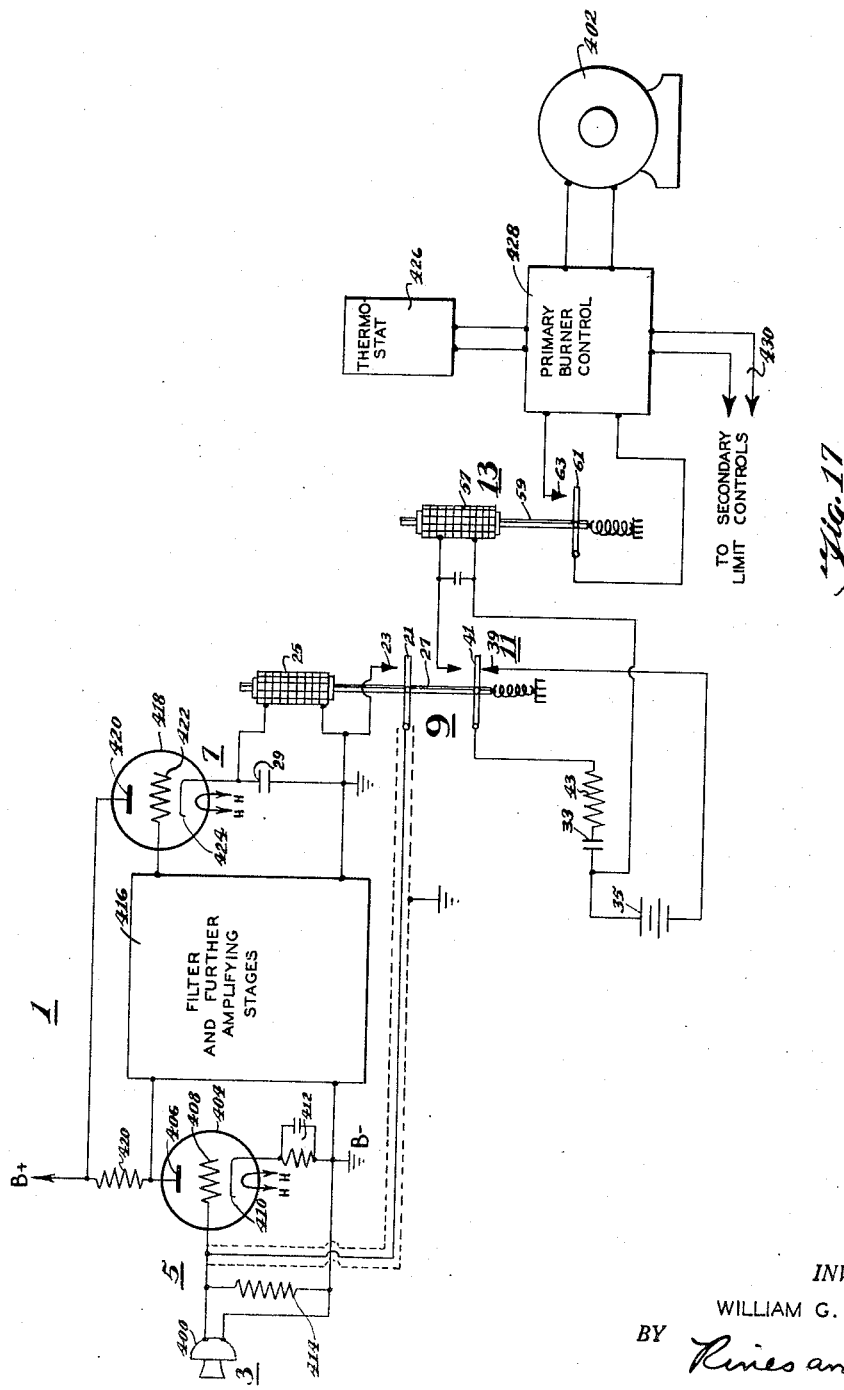

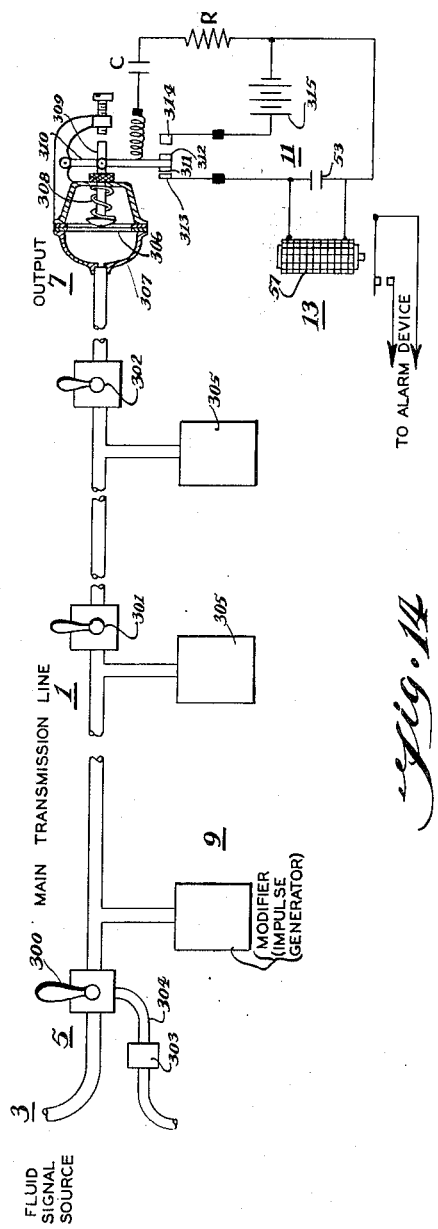
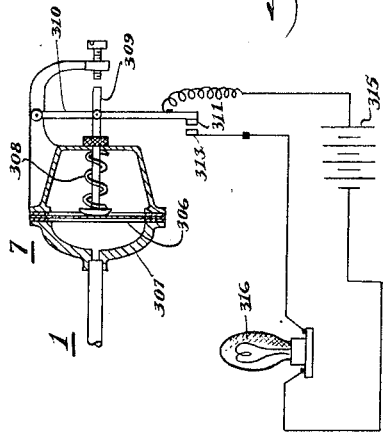

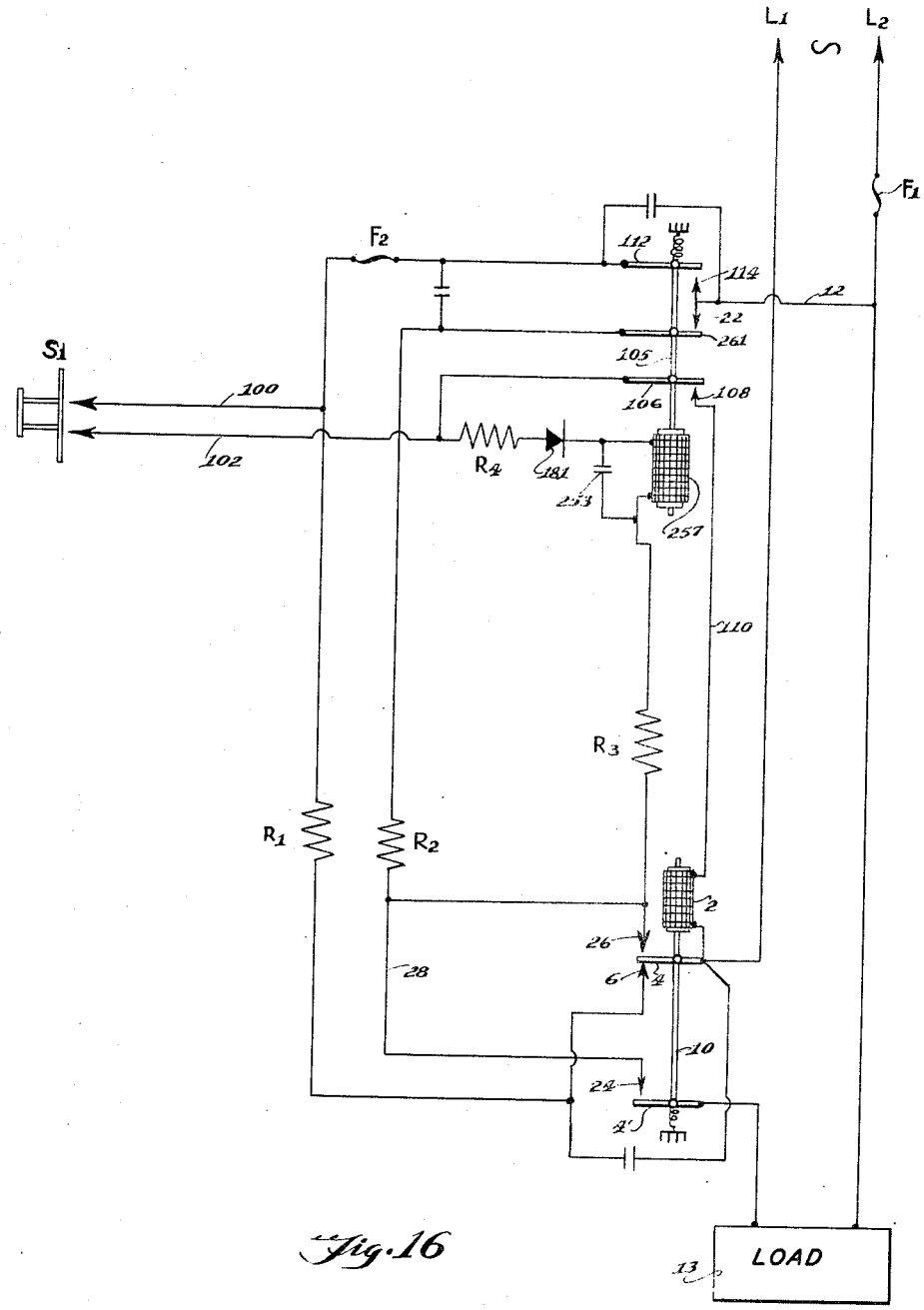

United States Patent Office 2,798,213
Patented July 2, 1957

2,798,213

CHECKING TECHNIQUE AND SYSTEM

William G. Rowell, Quincy, Mass., assignor to Scully Signal Company, Melrose, Mass., a corporation of Massachusetts Application August 19, 1953, Serial No. 375,224

33 Claims. (Cl. 340—213)

The present invention relates to apparatus and techniques for continually checking the proper operation of signal transmission systems. From a more limited aspect, the invention relates to systems for continually proving the correct functioning of all the components contained in electrical and electronic systems, as well as electromechanical and mechanical systems, during the operation of such systems.

The problem of detecting the improper functioning of an electrical or a mechanical system has long plagued the art. This problem has been particularly acute in applications where failure of the system may be accompanied by disaster. The electrical, electronic and mechanical equipments contained in aircraft and other vehicles, for example, are in such a category. Atomic and nuclear-process instrumentation and controls, including reactor controls, are also of such a nature. The safety devices on gas, oil, coal and other burners are also in this category. There are also a host of other systems where, though the consequences of failure or improper operation may not be disastrous, such incorrect operation gives rise to inconvenience, delays and added expense. Nearly all electrical or electronic circuits, such as amplifiers, control circuits, receivers, transmitters, signalling and communication systems, computers, recording and statistical equipment, measuring apparatus, electronic navigational aids, sonic detection devices, radar, timing systems, and so on, fall within such a class.

A large number of attempts have been made throughout the years, accordingly, to find a solution to this problem. One proposal involves duplicating in its entirety the system that it is desired to check. Comparison of the output of the duplicate systems will generally indicate failure or incorrect operation of one of the systems. Such duplication, however, is costly and intricate, and is entirely unsuited to many types of systems, including those of large size and complexity. Should an excessive overload occur, moreover, similar components in both systems could fail, so that mere comparison of the outputs of the systems is not a reliable indication of proper operation. Other proposals, chiefly employed in oil burners and related control apparatus, involve merely guarding against the failure of a few only of the apparatus components by particular associated checking relays and other devices, and are not absolutely "fail-safe." These are later discussed in detail. Still other approaches to the problem have been utilized in the field of electronic computers, which may contain thousands of vacuum tubes and hundreds of thousands of other electrical components. These approaches involve the periodic feeding to the computer of a known problem, and the checking of the answer then obtained. Since no single problem can utilize all of the hundreds of thousands of components, however, this at best is merely a sample check of part of the computer. This check, moreover, can only be effected once in a while, and not continually. A further example of still another proposal for obviating this pressing problem is that of applying a reduced voltage or other signal to the system and checking for a corresponding reduction in the output. While this may indicate the failure of certain system components, however, it cannot indicate the proper operation of all the system components, and, again, it cannot be effected continually. The same remarks apply to additional proposals relating to periodically sending a signal of known characteristics through the system, and manually checking the output for such a signal. Such operation is subject to the further disadvantage, moreover, that it does not check the system for proper operation with the normally intended signal.

While the above is illustrative of several of the principal types of prior-art checking systems, it is not all-inclusive. Suffice it to state that, prior to the present invention, the problem of obtaining continual, automatic, complete and absolute system-checking has been largely without solution, and that all prior-art checking systems of which the inventor is aware, have been subject to one or more of the above-described disadvantages, summarized as follows: unreliability, complexity, checking device itself may fail, not fully automatic, excessive cost and size, not continually checked, not adapted to check for all possible failures or mal-functioning, and not adapted for use in all types of systems.

An object of the present invention is to provide a new and improved apparatus and technique for checking the operation of a signal transmission system that shall not be subject to any of the above disadvantages, and that, on the contrary, is continual, entirely reliable, simple, foolproof, automatic, inclusive of all the system components, and universally adaptable to all types of systems. In accordance with the invention, this result is attained by applying the principal signal to be passed through a system to the input thereof, and during the application of the principal signal, repetitively applying a distinctive checking signal of at least a predetermined magnitude to the input at a rate or rates corresponding to a period or periods of repetition less than a predetermined time interval, in order repetitively to modify the principal signal in the input at the said rate or rates. This modification is preferably, though not essentially, in the form of a chopping signal applied through the medium of a reaction upon the input by the output of the system. The checking signal is recovered from the modified signal in the output, and means is provided, operable in the event of failure to recover the checking signal for a time substantially equal to the said predetermined time interval, for automatically indicating such failure.

A further object is to provide a technique and system for checking that is useful in any electrical, electronic, mechanical or electromechanical system.

An additional object is to provide a checking system that is of particular utility with electronic control systems, such as gas, oil and coal burner monitors.

Other and further objects will be explained hereinafter and will be more fully pointed out in the appended claims.

The invention will now be described in connection with the accompanying drawings:

Fig. 1 of which is a block diagram illustrating the principles of operation of the invention;

Fig. 2 is a schematic circuit diagram of a preferred type of checking system constructed in accordance with the present invention;

Figs. 3, 4 and 5 are similar schematic circuit diagrams of modifications;

Figs. 8 and 9 are modifications of the system of Fig. 7;

Fig. 10 is a circuit diagram of still a further modified system adapted to operate with a checking signal of a relatively high repetition rate;

Figs. 11 and 12 are circuit diagrams of another type of checking system employing transformers instead of checking relays;

Fig. 13 is a circuit diagram of a system in which not only the signal transmission itself is circuit-checked, but the load relay thereof is also simultaneously checked;

Fig. 14 is a side elevation, partly in section, of a mechanical system embodying the checking features of the invention;

Fig. 15 is a modification of a part of the apparatus of Fig. 14;

Fig. 16 is a schematic diagram of a modified relay-contactor monitor; and

Fig. 17 is a schematic diagram of still a further modification adapted for use with a sonic amplifier receiving system.

Figure 1:
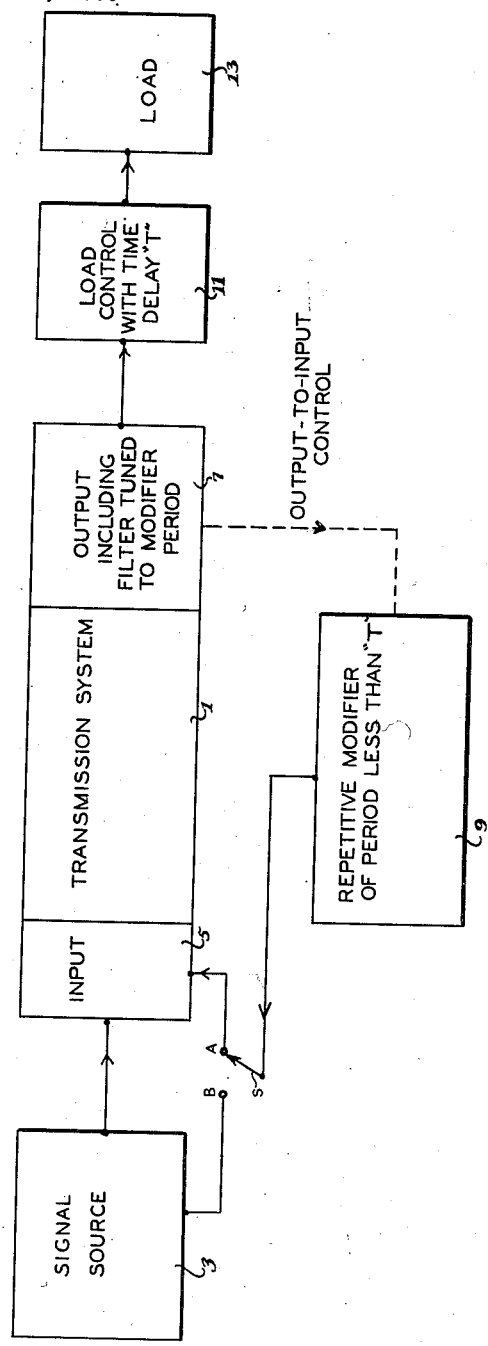

Since, as before-stated, and as hereinafter demonstrated, the technique underlying the present invention is capable of practice with a host of different types of electrical, electronic, mechanical and electromechanical systems, and is entirely independent of the apparatus used, it will conduce to clarity to commence the explanation of the invention in terms of the generalized block-diagram system of Fig. 1. This block diagram represents any such system 1 in which some principal signal from a source 3 is to be transmitted from the input 5 of the system 1 to the output 7 thereof. The term "signal" is used in this specification and in the claims in a very broad sense to connote any information, condition, matter, material or energy, and the like that is to flow from one side of the system, termed the input, through the system to the other side, termed the output. The invention provides a technique for continually checking or proving the correct and proper functioning of the system during the flow or transmission therethrough of the signal. This is effected through the use of a repetitive modifier 9, that may or may not be of a constant repetition rate, that is shown connected through a switch S and a switch position A, to the input 5 of the system 1. This modifier 9 repetitively modifies the principal signal fed from the signal source 3 to the input 5. If desired, the modification can take place right at the signal source 3, as when the switch S is thrown to position B. In any event, since the actual input to the transmission system 1 may be considered as comprising either the portion 5 alone immediately to one side of the system 1, or the portion 5 and the signal source 3 together, it may be generically stated that the repetitive modifier in all cases acts upon the principal signal in the input.

To serve the purposes of the present invention, the modifier must itself produce a signal modification that has at least a predetermined magnitude sufficient to cause it to pass through the parameters of the transmission system 1. This modification then becomes a repetitive checking signal that is recoverable in the output 7, providing that the output 7 includes a device responsive to the checking signal. It is essential, however, that the checking signal pass through the system only when the principal signal is also passing therethrough. In general, such a checking-signal responsive device would effectively be adjusted or tuned, electrically or mechanically or otherwise, to the period or periods of the repetition rate or rates of the repetitive modifying checking signal only, so as to exclude the principal signal from the source 3 and filter out or detect or recover the checking signal. Inasmuch as the checking signal can not exist in the output 7 if the principal signal from the signal source 3 has not been transmitted through the system 1 to the output 7, the presence of the checking signal in the output 7 indicates the proper functioning of the signal source 3 and the transmission system 1.

A further restriction upon the operation of the system for achieving the desired results resides in the necessity for automatically indicating when the system 1 is not functioning correctly. Obviously a mere temporary instantaneous loss of signal or a transient spurious response of the system 1 should not be confused with actual failure of the source 3 or the system 1. The output 7 is therefore cooperative with a load control 11 and a load 13 having a time delay of predetermined time interval T. Should the output 7 fail to recover the checking signal for this time interval T, then, and then only, should an indication automatically be made that there is a failure in the system 1 or in the signal source 3, or in the system 1 and the signal source 3. In the diagrammatic showing of Fig. 1, this indication is effected through exercising a control upon the load 13 as by energizing or de-energizing the same under the control of the load control device 11.

The final requirement for operation is that the rate or rates of repetition of the modifier 9 must be of period or periods of repetition less than the predetermined time interval T, as otherwise, the load 13 could become rendered effective or ineffective, whichever condition is desired to indicate failure, between two successive modifications of the principal signal, even though the system 1 and the source 3 were operating perfectly. It is preferable, furthermore, though not essential, as later explained, that the repetitive modifier be itself controlled by a type of feed-back reaction from the output 7 itself, as indicated generally by the dotted line labelled "output-to-input control."

Figure 6:
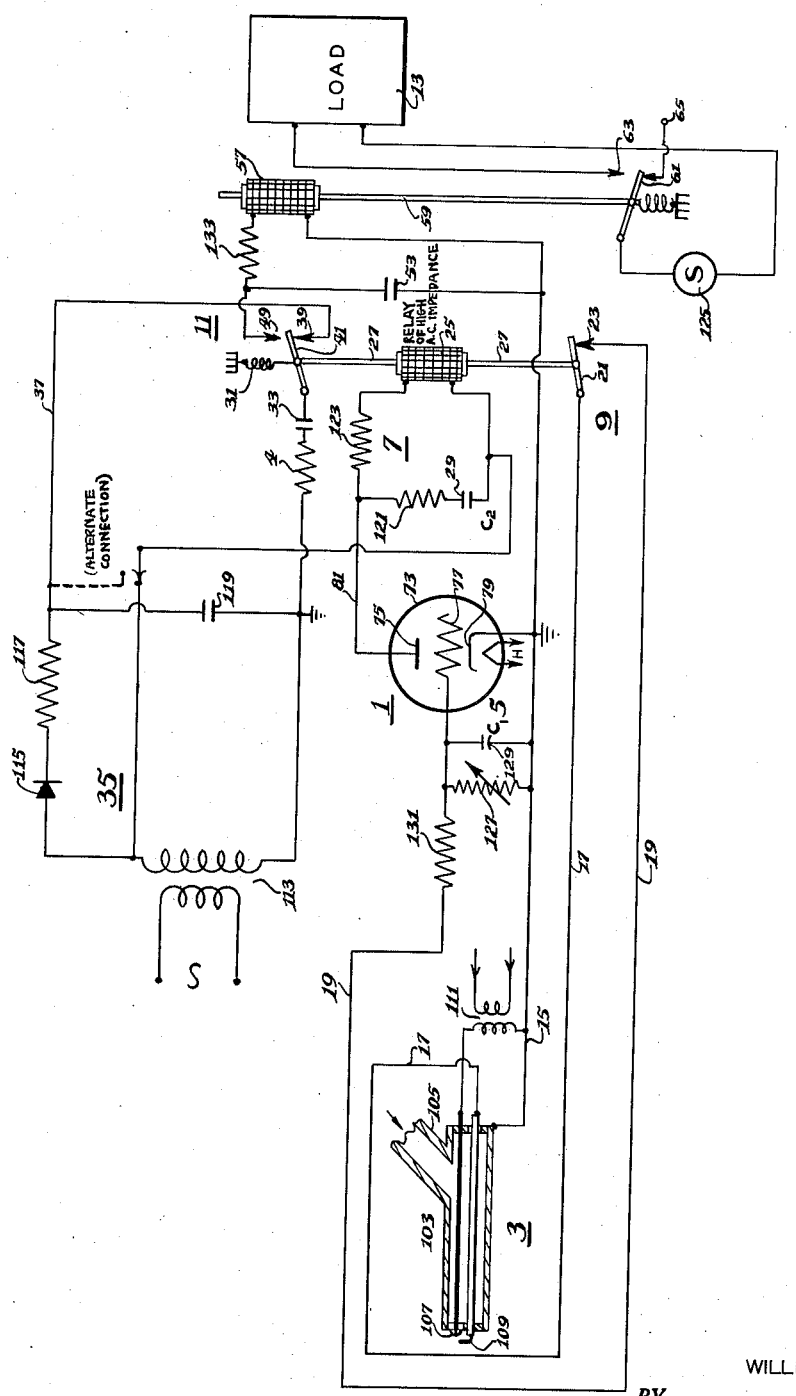
Fig. 6 is a similar diagram of a preferred embodiment of the invention as applied to a pilot-burner monitor system.
Figure 7:
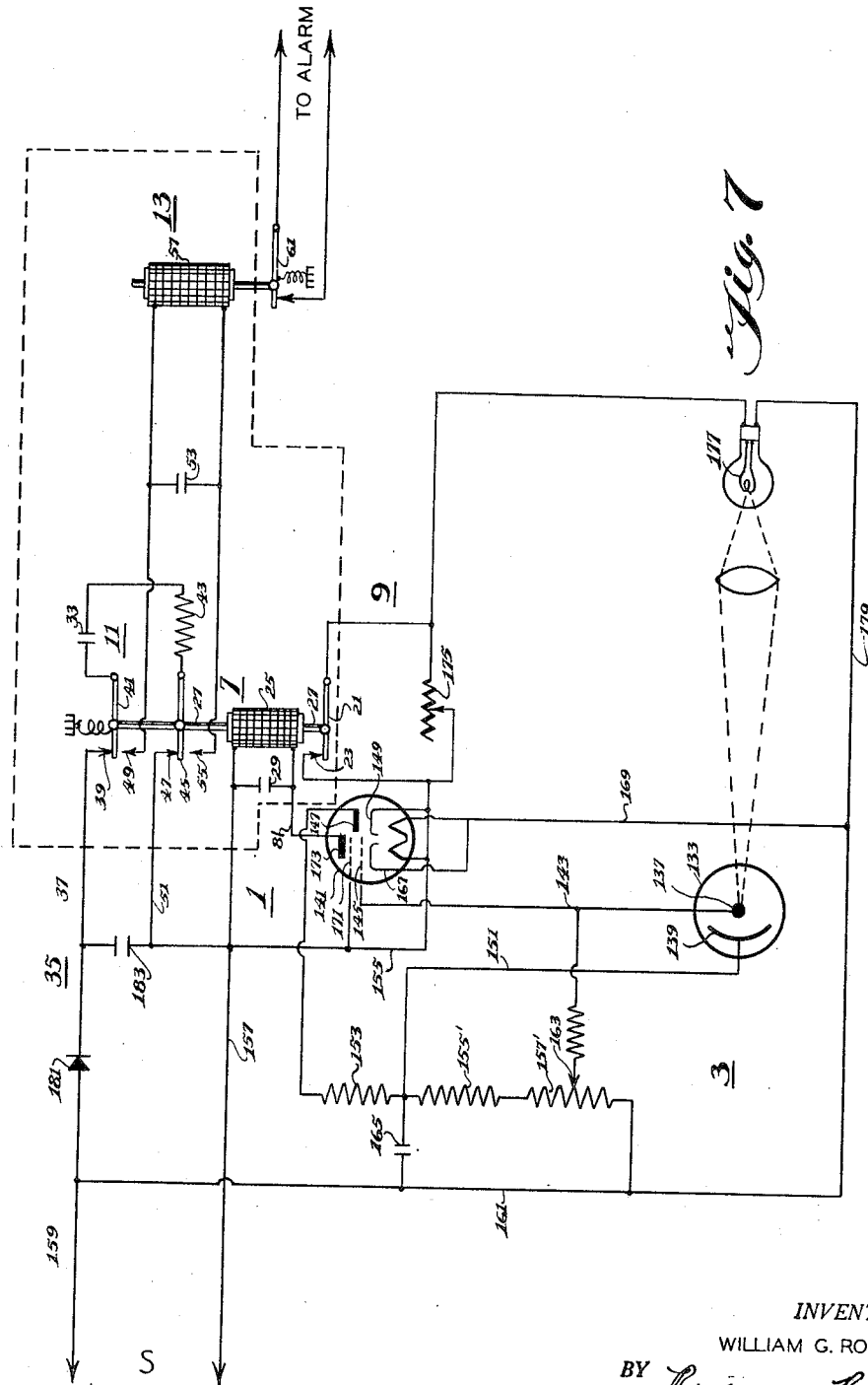
Fig. 7 is a similar diagram of the invention as applied to a photocell control system.

Turning now to a specific example of a system utilizing the checking technique of the invention, any type of electrical or electronic transmission system is schematically shown at 1 in Fig. 2. This system may be an electrical network or other transmission device; an amplifier system, as shown in Fig. 5; an electron-tube control system, as illustrated in Fig. 6; a radiation receiver system, as shown in Fig. 7; a radiation modulation system, as in Fig. 8; and so on. In this connection, it is to be understood that while particular circuit or other details may hereinafter be described and illustrated in connection with one particular figure only, this is for purposes of illustration, since all such circuits and details may be directly incorporated in all of the other figures as well.

Any desired electrical signal, termed the principal signal, is fed or applied from a signal source 3 to the input 5 of the transmission system 1 by a first conductor 15, and by second and third conductors 17 and 19 that may be connected together when a switch 21 is in engagement with a contact 23, as shown. When the switch 21 is pivoted downward to dis-engage from the contact 23, however, the conductors 17 and 19 become disconnected, and the principal signal from the source 3 is cut-off from the input 5. Periodic or repetitious pivoting of the switch 21 into and out of engagement with the contact 23 will therefore modify, by rectangular- or square-wave amplitude chopping or pulsing, the principal electrical signal in the input of the system 1. The switch 21 and contact 23 thus comprise the repetitive modifier 9 discussed in connection with Fig. 1.

Since the chopping signal, moreover, cannot exist unless the principal signal from the source 3 is present, it cannot appear in the output 7 in the absence of the principal signal. The chopping make-and-break modification, moreover, clearly is of the magnitude of the principal signal itself, so that it passes through the parameters of the system 1 since they are designed to transmit the principal signal. These two criteria, previously set forth, are therefore satisfied by the system of Fig. 2.

The signal output 7 is shown containing a load comprising a relay coil 25 the armature 27 of which controls the pivoting of the chopper switch 21. Shunting the relay coil 25 is a condenser 29. Assume, for purposes of illustration, that the relay 25 is normally de-energized in the position shown. The application of the principal signal to the input 5 will cause the signal to pass through the system 1, assuming it is operating correctly, to energize the relay 25. This energization of the relay 25 causes the armature 27 to move downward, opening the switch 21 from the contact 23 and thus disconnecting the signal source 3 from the input 5. The condenser 29 will hold the relay 25 energized for a period of time depending upon its discharge-circuit time-constant through the relay 25. The relay 25 then becomes de-energized, the armature 27 returns to its illustrated position under the action of a return spring 31, and the principal signal is again applied to the input 5, thereupon again to energize the relay coil 25 after transmission through the system 1. The selection of the values of the relay coil 25 and the condenser 29 determines the rate of the repetition of the chopper modifier 9. This selection preferably produces a rate the period of which corresponds to the desired predetermined time interval T. This reaction of the output upon the input through the control of the chopper modifier 9 by the chopped output signal is thus of the output-to-input feed-back control type discussed in connection with Fig. 1.

The load control 11 finds its counterpart in Fig. 2, also. An energy-storing condenser 33 is normally charged from a direct-current voltage source schematically designated by the number 35, through a conductor 37, a contact 39, a switch 41 normally held in engagement therewith, a resistor 43, a further switch 45 normally engaging a further contact 47, and a further conductor 51. Since the switches 41 and 45 are also controlled by the armature 27 of the relay 25, they move synchronously with the operation of the chopper switch 21 and thus effectively detect or recover from the signal in the output 7 and reproduce therefrom the chopping checking signal itself. As the switches 41 and 45 thus reproduce the chopping rate, however, they alternately effect the storing of the energy in the condenser 33, above described, and the delivery, during the cycle of the chopping, of such stored energy through contacts 49 and 55 to the ultimate load impedance 13, such as a lamp or other indicator. This load impedance 13 may be a relatively slowly responding load that is held energized by the shunt condenser 53 for the predetermined time T. Should the chopping signal fail to be detected or recovered and reproduced by the load control device 11, then the load impedance 13 would become de-energized after the elapse of a time substantially equal to the predetermined time interval T. So long as the chopping rate is of period less than T, however, as previously pointed out, the condenser 33 will continue, during the proper functioning of the transmission system 1 only, to feed energy to the load impedance 13 at a rate sufficiently rapid that the load impedance 13 remains continuously energized during the correct functioning of the system 1.

Any possible component failure in the system 1, its input or output, the signal source 3, the circuit-checking modifier 9, the load control device 11, or the source 35, therefore, will result in the de-energization of the load impedance 13 at a time T after the occurrence of the failure. The circuit checking, moreover, is continual and fully automatic. The apparatus required is simple, self-checking, easily connected into any desired system 1, and universally adaptable. In view of the distinctive characteristics of the chopping modification, furthermore, it is extremely improbable that any circuit failure or malfunction could imitate the checking signal in all the necessary particulars above treated.

Instead of a lamp or similar indicator load 13, of course, other types of indication-providing devices may be employed. In Fig. 3, as a further example, a relay coil 57 serves as the slowly responding load impedance 13. The armature 59 of the relay coil 57 may operate a switch 61 to connect terminals 63 and 67 or terminals 63 and 65, depending upon whether the system 1 is operating correctly or is incorrectly working. The terminals 63, 65 and 67 may clearly control the feeding of energy to visual, audio, alarm or other indicators, or may conduct control voltages or currents indicative of improper operation of the system 1 to effect the automatic shut-down of the signal source 3, the voltage source 35 or the rendering ineffective of the system 1, as is well known. These same remarks apply, also, in connection with the other embodiments of the invention. The term "indicate," indeed, as used in the specification and the claims, and as more fully explained hereinafter, is intended to embrace not only such visual or audio indications, but, also, indications that are evident through the fact that there is effected the operation or shut down of a device such as a control apparatus.

It is by no means necessary that the modification be of the particular passive-chopper type discussed in connection with Fig. 2 in which no additional modifying voltage is employed, but the existing principal voltage itself is modified. If it is desired to retain the substantially rectangular or square wave-form type of modification, for example, but to introduce it as an additional superposition voltage signal upon the principal signal, this may easily be effected merely by incorporating a further source of energy 69, such as a battery, in the connection of the conductor 19 to the input 5, as illustrated in Fig. 4. Each connection of the switch 21 to the contact 23 will then add the voltage of the source 69 to the principal signal voltage in the input 5. An impedance 71 may preferably be connected between the conductors 17 and 19, as also shown. The load impedance 13 of Fig. 3 is incorporated in the system of Fig. 4 to illustrate a complete system.

A specific example of a simple vacuum-tube or electron-discharge tube amplifier-type transmission system 1 is illustrated in Fig. 5. The amplifier is shown comprising a single vacuum tube 73 of the triode type, having a plate or anode electrode 75, a control electrode or grid 77, and a cathode electrode 79 that may, for example, be of the indirectly heated type operable to release electrons in response to the heating action of a heater H upon the cathode 79. Clearly, other types of amplifiers including tetrodes, pentodes, magnetic amplifiers, transistors and the like, some of which are later discussed, may also be employed, as may any desired train of amplifier stages, such as successively coupled amplifiers, cascoded or cascaded stages, push-pull or parallel stages, and so on. The type of amplifier used, and the type of amplifier circuit and configuration is immaterial to the operation of the invention so long as there is a signal input side and an output side in the system. The single triode 73 thus is illustrative, in simplified form, of any such system.

The plate 75 of the amplifier 73 is connected by the output conductor 81 through the relay coil 25 to a source 83 of anode potential that is also connected to the conductor 15. The signal source 3, which may be of any desired nature, such as a voltage or current generator, a receiver, a transmitter, an energy signal detector of alternating current or direct current, pulsating or any other type of energy, is connected by the conductor 15 to the cathode 79 and by conductors 17 and 19, through the chopper switch 21, to the control electrode 77 in the input of the amplifier 1. Instead of this input grid-coupling of the signal, of course, cathode-coupling or other types of input coupling may be employed, as is well known. Conduction of the amplifier 73 in response to the application of the principal signal in its input will effect energization of the relay 25, the opening of the switch 21, and the consequent disconnection of the signal from the input of the amplifier 73, all as described in connection with Fig. 2.

The same load control device 11 illustrated in Fig. 2 could also be used in the system of Fig. 5. In order to illustrate another modification, however, a somewhat different load control device 11 is utilized in the system of Fig. 5. This load device 11, unlike that of Fig. 2, does not deliver energy to the ultimate load 13 while the chopping checking signal is being recovered, but rather, at the end of the cycle of chopping, namely, when the chopper has ceased. The armature 27 of the output relay 25, moreover, is shown normally held downward in the de-energized state of the relay 25, the armature 27 moving upward upon energization of the output relay 25. This modification could, of course, also be used in the system of Fig. 2 and the other embodiments of the invention, if desired. The voltage source 35 is here connected by the conductors 37 and 51 to the switches 41 and 45. The voltage of the source 35 is thus rapidly alternated between the pairs of contacts 49—55 and 39—47, feeding voltage by common conductors 85 and 87 to two further relay coils 89 and 91 in series, the latter of which is shunted by a condenser 93. The relay 91 is a very low-voltage-operating relay that does not require the full voltage of the source 35 to operate it. It thus remains energized even though only a fraction of the voltage of the source 35 is applied to conductors 85 and 87 as a result of the repetitive make-and-break of the switches 41 and 45. So long as the load control device 11 recovers the chopping checking signal from the output relay 25, the switch 95 will be pivoted out of engagement with the contact 97, opening the alarm circuit. The relay 89, on the other hand, is selected to require almost the full voltage of the source 35 to energize it, so that if the system 1 is operating satisfactorily, with the oscillating switches 41 and 45 reducing the value of the voltage from the source 35 applied to conductors 85 and 87, the relay 89 remains un-energized. Upon failure to recover the checking signal, however, the switches 41 and 45 stop moving and remain in one of their extreme positions, so that the full voltage of the source 35 becomes delivered to the relay 89 to cause its switch 99 to pivot into engagement with the contact 101, closing the alarm circuit. The relay 91 serves further to check the continuity of the relay 89 since the relay coils are series-connected, as above mentioned.

Fig. 6 illustrates a preferred circuit-checking apparatus similar to that described in connection with the systems of Figs. 2, 3 and 4, but with a different type of amplifier operation than that described in connection with the circuit of Fig. 5. For the purpose of describing a complete system, the circuit of Fig. 6 is shown operating with a signal source 3 that comprises a gas-pilot flame-monitor probe. While a gas monitor is illustrated, the same device is equally useful with oil burners and other fuels. This condition-monitor device or sensor may be of the optical photo-electric cell type, later discussed, or of the flame-probe type illustrated in Fig. 6.

Before proceeding to discuss the details of the system of Fig. 6, however, it is in order to explain the very important and entirely novel results attained in safety-control devices of this character by the present invention—results that have long been sought, and never heretofore attained. The primary purpose of an electronic oil or other burner control circuit is to shut off the fuel in the event that a predetermined unsafe condition occurs. Such a condition might be the failure to ignite the fuel, or a failure of combustion when the burner is in operation. The supervisory or monitor means to actuate the control, as before stated, is usually either an optical system, such as a photocell sensor or condition monitor, or a flame probe sensor or condition monitor disposed in the flame. The photo-cell will actuate the control system when subjected to the visible or invisible light or heat characteristics of the flame. The flame probe system utilizes the electrical characteristics of the flame which permits the passage of current through the flame to actuate the control system. In its simple form, the electronic control circuit consists of a flame-sensing means, an electronic amplifier and a control relay, commonly called a supervisory relay. The sequence of operation is generally as follows: A switch in the space to be heated is closed to start the oil burner. If, after a predetermined time, combustion is not established, a timing relay will shut off the burner. If combustion is established, however, a flame will be present and the flame-sensing means will function to transmit a voltage signal to the amplifier, which, in turn, causes the supervisory relay to operate, thereby to maintain the desired operation of the burner. Should an undesired failure of combustion occur, it is desired that the flame-sensing means respond to such failure and that the amplifier cease conducting, thus to cause the de-energization of the supervisory relay, which, in turn, shuts down the burner. This is the desired sequence of events. All present-day electronic oil and other burner controls, however, have a characteristic inherent weakness in that certain components or combination of components may fail that will permit the supervisory relay to remain in operative condition, thereby keeping the burner in operation, even though combustion is lost and the flame-sensing means is no longer transmitting a flame-monitor signal to the input of the amplifier. An extremely hazardous and costly situation is thus presently developed by the very safety control that is relied upon to prevent the burner from operating during an unsafe period. Should a component failure take place, for example, causing the supervisory relay to remain operated, followed by a loss of combustion, the burner or main fuel valve will remain in operation indefinitely. If the above loss of combustion was caused by a temporary fuel-line stoppage, the resumption of the fuel flowing to the burner would continue until the fuel storage tanks were exhausted or this condition were visually detected. Industrial fuel tanks commonly are of 10,000 gallons or more capacity, so that this condition is extremely grave.

It should now be made clear that many electronic components may and, in fact, do fail, resulting in an unsafe failure condition in such monitor controls. One or more components in the electronic network ahead of the vacuum-tube amplifier system may fail, for example, causing the amplifier system to conduct and hold the supervisory relay operated. A short circuit between the anode and the cathode in one or more of the vacuum tubes will cause the supervisory relay to respond. In some cases, a grounded winding in the supervisory relay itself will cause its response. A simulated signal produced by one or more component failures will also cause a response of the supervisory relay.

By the present invention, and, in particular, by the system of Fig. 6, adapted especially for use in flame-monitor control systems, for the first time, all these hazards are completely eliminated.

Returning now to Fig. 6, the flame-probe monitor comprises a burner 103 having a gas inlet 105, an igniter electrode 107 near the flame end of the burner, and an L-shaped flame probe electrode 109 disposed in the space to be occupied by the flame. The gas is ignited by applying a high voltage from a transformer 111, between the igniter electrode 107 and the burner 103. This high voltage also serves as a source of flame-monitoring current that may flow to the probe electrode 109 through the flame. The advantages of this type of operation, including reliability of operation irrespective of the formation of carbon products, and safety in insuring that a flame caused by anything other than the ignition voltage will not be detected, are fully set forth in my copending application, Serial No. 325,599, filed December 12, 1952. It suffices for present purposes to state that a negative signal voltage is provided in the presence of a flame between the input conductor 17, connected to the probe 109, and the input conductor 15, connected to the burner housing 103, shown grounded.

The amplifier tube 73, unlike that of Fig. 5, is normally conducting, and the negative signal from the flame-monitor cuts off the tube 73. The circuit is quite similar to that discussed in connection with Figs. 2, 3 and 5, however, with a few exceptions. The source 35 of direct current is illustrated as an alternating-current transformer 113 in combination with a rectifier 115, a current-limiting resistor 117 and a storage condenser 119. The condenser 29 shunting the relay coil 25 is provided with resistors 121 and 123 to assist in obtaining the right time constant for de-energizing the relay 25, thereby to obtain the correct rate of repetition for the chopper modifier 9. The relay 25, as labeled, is preferably a relay of high impedance to alternating current. Such a relay 25 is useful wherever a component failure can apply alternating current to the relay, as in Fig. 6 and in the other figures of the invention utilizing alternating-current voltages. The functions of the switch 45 and the contacts 47 and 55 have been incorporated into the single switch 41 and the contacts 39 and 49 in Fig. 6. The output relay 57, furthermore, operates upon its switch 61 to engage the single contact 63 in order to energize the load 13, such as an alarm or visual lamp indicator, from a further energy source 125. The load 13, on the other hand, may comprise the burner and fuel supply system, so that indication can then be provided by operating or shutting down a control circuit at 65 or operating any other desired indicator.

Now that the circuit modifications have been detailed, it will probably conduce to clarity to describe the sequential operation of the system of Fig. 6. In the absence of the condition of the flame-probe monitor signal, the tube 73 conducts since the variable resistor 127 between the control electrode 77 and the cathode 79 maintains the grid and cathode at about the same zero potential. Relay 25 this becomes energized and will cause the armature 27 to move downward, causing the modifier chopper switch 21 to engage the contact 23. The energy storage capacitor 33 will charge from the source 35 through the switch 41 which has also become moved by the armature 27 of the relay coil 25 into engagement with the contact 39. Relay 57, however, is un-energized and the load 13 is ineffective.

Since the switch 21 is closed, if a flame is present, the sensor probe 109 is operative to apply a negative voltage to the input 5 of the amplifier 73, between its grid 77 and cathode 79, via conductors 17—19 and 15, to cut off the tube 73. The time required to effect this cut-off depends upon the time-constant of the resistor 127, its shunt capacitance 129 and a series resistor 131 in the connection of the conductor 19 to the grid 77 of the amplifier 73. The relay 25 will be held energized after the cut-off of the tube 73 by the charge on the condenser 29. The time constant of the delay of this charge through the relay coil 25 and resistors 121 and 123 determines when the coil 25 becomes de-energized and opens the chopper switch 21 in response to the restoring action of the spring 31, rendering the sensor probe 109 inoperative to affect the amplifier 73. The condenser 129 has meantime, during the discharging of condenser 29, had an opportunity to develop the full negative signal voltage thereacross for subsequent use. The switch 41, upon the de-energization of the relay coil 25, connects with contact 49, delivering the energy stored in the condenser 33 to the load control relay 57 through a further resistor 133. The energized relay 57, causes its armature 59 to pivot the switch 61 into engagement with the contact 63, thereby to energize the ultimate load indicator 13 from the source 125, indicating that the system is working satisfactorily.

The negative voltage on the condenser 129 leaks off through the resistor 127 until the tube 73 again conducts, re-energizing the relay 25, closing the chopper switch, recharging the condenser 33, and so on, repetitively. The charge on condenser 53 will hold the relay 57 energized since this slowly de-energizing relay is provided with a high resistance and a low drop-out voltage. It is the time of de-energization of this relay 57 that is adjusted to the predetermined time interval T discussed in connection with Fig. 1. For the particular system of Fig. 6, adapted for pilot burners, about 2½ seconds is desirable. The period of the chopping is therefore adjusted to a value less than this time interval, as before explained, preferably to a chopping repetition rate of about one pulse per second, so that the relay 57 will not de-energize between pulses of the chopping checking signal recovered by the load control device 11.

It will be evident from an inspection of this circuit that any possible open or short circuit in the input of the amplifier 73 will maintain the grid and cathode at zero potential and maintain the relay 25 energized. No checking pulsations are then possible, moreover, and with the switch 41 in engagement with the contact 39, the relay 57 will remain de-energized. Similarly, all possible component failures, including tube short- and open-circuiting, will cause the checking signal pulsations to cease, and relay 57 to de-energize. The grounding of the relay coil 57 will not result in holding it energized since the un-grounded end is disconnected from its potential source by the switch 41. If this end were grounded, indeed, the relay 57 would, of course, be inoperative. If desired, the relay coil 57 could equally well be connected with both ends of the coil disconnected by the switches 41 and 45, as shown in Fig. 4. The complete transmission system 1 and signal source 3, are therefore absolutely fail safe, being continually checked.

The description of the invention has thus far been limited to chopping or pulsing types of signal modification effected between the signal source and the transmission system 1. In Fig. 7, an illustration is presented of the application of the signal modification to the signal source itself, which, as before stated, may still be considered as part of the input to the system. This corresponds to the connection of the switch S to position B in Fig. 1. Further to illustrate the wide diversity of application of the present invention, an electromagnetic radiation receiver signal source 3 is illustrated in the form of a photocell 133, the anode 137 of which is connected by a conductor 143 to the control electrode 145 of a tetrode amplifier contained in a single envelope 141 with a diode rectifier 147, 149. The cathode 139 of the photocell 133 is connected by a conductor 151 through a resistor 153 to the anode 147 of the rectifier diode 147, 149. The cathode 149 of the diode 147, 149 is, in turn, connected by a conductor 155 to the lower side 157 of the alternating-current mains. Relative cathode-to-anode potentials in the photocell 133 are obtained by the dropping resistors 155' and 157' connected between the conductor 151, connected to the photocell cathode 139, and a conductor 161 that connects with the other side 159 of the mains. From the conductor 143, a tap 163 is connected to the resistor 157', thus permitting variation of the potential upon the photocell anode 137. A condenser 165 shunts the resistors 155 and 157.

In view of the above connections and the further connection of the cathode 167 of the tetrode section of the tube 141 by a conductor 169 to the conductor 161, the signal developed in the photocell 133 is applied to the input of the tetrode. The screen electrode 171 thereof is connected to the before-mentioned conductor 155. The output of the tetrode amplifier is fed from the plate 173 thereof by conductor 81 through the relay coil 25 to the conductor 157. The armature 27 of the relay coil 25 either short-circuits or permits the insertion of a variable series resistor 175 in circuit with a lamp 177 that is to illuminate the photocell 133. The lamp 177 is energized by a conductor 179 connecting through conductor 161 to the conductor 159 of the mains, and either through the resistor 175 or through the short-circuit provided by the closed switch 21 and contact 23 to conductor 155 and the other side 157 of the mains.

Thus the chopping or pulsing action of the relay 25 causes the illumination of the lamp 177 to be repetitively varied, modified or modulated as the dimming series resistance 175 is put in and effectively out of the lamp circuit. The repetitive modification or modulation is thus provided at the source 3 of the signal. The upper part of the circuit including the load control device 11 and the load 13 are similar to the corresponding parts of Figs. 2 and 3. The line rectifier 181 and storage condenser 183 serve as the direct-current source 35 of Fig. 2.

The system of Fig. 7 thus provides for introducing the repetitive checking-signal modification right at the source of the principal signal. This system is of particular advantage for use in fire and burglar alarms and the like, where the condition of interruption of the light beam from the lamp 177 or any component failure in the light source, the photocell sensor, the amplifier or the checking circuit will actuate the alarm. The necessity for a continually circuit-checked, fail-safe burglar or fire alarm is, of course, obvious.

In the previously discussed embodiments of the invention, use has been made of the reaction of the output signal upon the input through the control of the repetitive modifier by the output. It has before been stated that though this is deemed most desirable, it is not essential. In Fig. 8, for example, precisely the same system as that illustrated in Fig. 7 is shown, except that the output relay does not control the repetitive modifier 9. An external repetitive modifier (omitting the dotted connection in the generalized diagram of Fig. 1) is there used. The modulation of the light source 177 is effected by any desired light modulator 185, providing the checking signal of proper magnitude and rate upon the principal light beam, entirely without reaction or control from the output 7. Should the system 185 fail, of course, this is indicated automatically by the loss of the checking signal, and, in some cases, of the principal signal. Similarly, in each of Figs. 2 through 6, the chopper switch 21 or other modulating device could also be independently vibrated by any desired well-known external vibrating source, such as a magnetostrictive, piezoelectric or magnetomotive vibrator, not shown, not under the control of the relay 25. In connection with Fig. 4, indeed, the complete switch 21 could be omitted, and the source of energy 69 could constitute an appropriate repetitive pulse or other appropriate modulating-signal generator. Such operation could also, of course, be effected in the systems of Figs. 2, 3, 5 and 6, as well, and is later discussed in connection with Figs. 11 and 12.

A further practical application of the system of Fig. 8 is illustrated in Fig. 9, wherein objects 137 upon a conveyor mechanism 189 may interrupt the principal light-beam signal modified by the checking signal, providing a type of resultant pulse amplitude-time modulation in the signal received by the photocell 133. A further relay 191, shunted by a further condenser 193 is shown connected in the output 7 in series with the relay 25. This further relay may serve to actuate a switch 195 that operates a counting apparatus 197, to keep track of the number of objects 187.

In connection with the systems of Figs. 7, 8 and 9, furthermore, it is to be understood that any type of energy generator could be substituted for the lamp, and the appropriate condition-monitor device, sensor or receiver therefor, for the photocell, these figures being illustrative only of particular types of circuits adapted to very wide use. If radio waves or sound waves were used, for example, as in an obstacle detection system, an appropriate radio or sound transmitter would be used, and an appropriate radio-wave or sound-wave detector, as well.

Mention has previously been made of the extreme utility of circuit-checking in electrical and electronic computers. The amplifiers of the previously discussed embodiments of the invention could, of course, be embodied in computing or any other circuits. Fig. 10 is an example, however, of a particular type of computer circuit, namely, an impulse counting and frequency-division circuit. Impulses from a signal source 3 are fed by a conductor 201 through a diode rectifier 203 to the control electrode 77 of an amplifier tube 73. The cathode 79 of the tube 73 is provided with a biasing resistor 205 to ground, and the tube is normally non-conducting. This bias is overcome only upon the storage of a predetermined number of successive impulses by the condenser 207, shunted by a resistor 215, in the circuit traceable from the conductor 201, through the diode 203, the conductor 209, the condenser 207 and the conductor 211, grounded at 213. When the predetermined number of pulses have been received from the signal source 3, the charge on the condenser 207 will raise the voltage of the grid 77 of the tube 73 sufficiently to cause the tube 73 to conduct. The condenser 207 is completely discharged through ground connections 213 and 217 when the relay 25 operates to cause the switch 21 to engage the contact 23. The tube 73 thus conducts once to every so-many input pulses, providing a counting and frequency-division operation. The frequency division ratio may be varied by varying the setting of the cathode bias resistor 205.

There is thus produced energization of the output relay 25 as in the previous embodiments of the invention. The switch 21 produces chopping or the effective repetitive disconnection of the input signal from the input 5 of the tube 73 by shorting the condenser 207 between the ground connection 213 of the conductor 211 and the ground connection 217 of the switch 21, upon energization of the relay 25. The energy storage condenser 33 charges through the resistor 43 between the B+ and B— terminals of the power supply, periodically delivering the energy to the relay 57 for actuating the load-control switch 61, as before described.

The relay-controlled switch type of repetitive modifier has previously been treated almost exclusively, except for the systems of Figs. 8 and 9. This is an extremely efficient, simple, inexpensive and reliable type of output device and repetitive modifier. It has before been pointed out, however, that other types of output devices and modifying checking-signal sources can also be used, and Fig. 11 is an illustration of one such, embodying an appropriate output transformer in substitution for the relay 25, and more conventional modulator circuits in substitution for the switch modifier 21. To the input 5 of the system 1, such as an amplifier 73, is applied a repetitive modulation signal from a modifier device 9 that may, for example, be a conventional pulse generator or other checking-signal generator of distinctive characteristic not reproducible in the system 1 in the absence of the modifier 9, and adapted to be transmitted through the system 1 only in the presence of the principal signal, as before explained. The modified or modulated principal signal is transmitted through the system 1 to the output 7 and the checking signal is there recovered in a transformer 249 tuned to recover the modifying checking modulation that may be imposed upon the principal signal in the input 5 of the amplifier 73. The amplifier 73 is similar to that discussed in connection with the embodiment of, for example, Fig. 10. The upper terminal of the primary winding 251 of the transformer 249 is connected by the conductor 81 to the plate 75 of the tube 73, in the output 7. The lower terminal is connected to a source of amplifier plate voltage B+, the negative terminal B— of which is connected through the cathode bias resistor 205 to the cathode 79 of the amplifier 73. The secondary winding 253 of the transformer 249 feeds the modifying checking signal recovered in the output 7 by the tuned transformer 249, and applies the same through a condenser 255 to a rectifier 257, shown connected between the condenser 253 and the lower terminal of the secondary winding 253. The resulting voltage is applied to a condenser 259 shunted across a load relay 261 that is adapted to open and close contacts 263 of an indicator device of any desired type, such as an alarm. Since the transformer 249, substituted for the output relay 25, does not pass a relatively steady principal signal voltage from the primary winding 251 to the secondary winding 253, but, rather, only alternating or pulsating voltages, such as the repetitive checking-signal modifications, the apparatus of Fig. 11 fully circuit-checks the system 1. The condenser 255 and rectifier 257 are employed to check the possible further condition of a short in the transformer 249 since the voltage applied to the condenser 259 to operate the relay 261 would not be stepped up by the secondary winding 253.

If the output-to-input feed-back type of checking modification is desired instead of the external modifier 9, the contacts 263 may operate upon the input 5 in the same manner as the chopper switch 21 of, for example, Figs. 2 and 5. In this connection, it should be observed that the chopper switch 21 of the previously discussed embodiments of the invention could itself be caused to strike a bell or actuate any other sort of alarm device, to indicate proper operation of the system.

In order to avoid the possibility that simultaneous multiple failures might provide a false indication of proper operation, the output of the system of Fig. 12 may be employed, instead of that of Fig. 11, utilizing a much greater voltage in the load-control relay, such as with the aid of the illustrated two-to-one step-up transformer 250 adapted to be energized by repetitive checking signals of at least a predetermined repetition rate. The de-energization time of the secondary winding 254 of the transformer 250 and the relay coil 260 will determine the predetermined time interval T. The relay 260, moreover, is shown as an alternating-current relay, preferably, though not essentially, of the slow-release type, particularly if the modifying checking impulses are quite slow. Through the use of the step-up transformer 250 to provide a magnetically amplified voltage in the secondary winding 254 thereof, a failure resulting from shorting between the primary and secondary windings 252 and 254 thereof will not give a false indication of proper operation. Open- or short-circuits anywhere in the system will, of course, cause complete loss of voltage in the relay coil 260. If desired, furthermore, the relay 260 may be replaced by a direct-current slow-release relay, in which event a rectifier network similar to that shown in Fig. 11 may be employed. In some applications, moreover, as before described in connection with other embodiments of the invention, the relay 260 may be omitted and the load applied directly to the secondary winding 254 of the transformer 250.

Not only may entirely different types of output-circuit devices and checking-signal modifiers or modulators be employed to practice the present invention with any desired type of transmission system, to provide continual automatic checking of the transmission system components and of the signal source itself, therefore, but the ultimate main load control relay contactor, itself, external to the system, may be checked for proper operation, if desired. This is accomplished through the use of a further relay for monitoring the ultimate main load control relay. For purposes of illustration, the main load control relay monitoring system is shown in Fig. 13 operating with a photocell-type circuit that is circuit-checked, as before described in connection with the system of Fig. 7. It is to be understood, however, that this load-relay monitoring may similarly be carried out with any and all of the other embodiments of the invention.

The components in Fig. 13 that correspond to similar components in the system of Fig. 7 are identified by the same numerals so that it is unnecessary to repeat the complete description of the circuit since it has partly been described in connection with the embodiment of Fig. 7. The system of Fig. 13, basically, is circuit-checked in the same manner as the circuit of Fig. 7. A few differences exist, however, which will now be pointed out. The photocell 133 is of the reverse-acting type in which a threshold intensity of light from the lamp 177 causes the tetrode amplifier 141 to become biased to cut-off as a result of the decrease in internal resistance of the photocell, and thus de-energizes the plate or output relay 25. A forward-acting circuit could, of course, be used merely by reducing the value of the resistor 162 adjacent the tap 163 and reversing the same in the photocell circuit so that the amplifier 141 would conduct upon the receipt of the threshold light intensity by the photocell 133. The diode 147—149 is shown in Fig. 13 disposed in an envelope 141' separate from the tetrode envelope 141, but it could be disposed in the same envelope 141, as shown in Fig. 7. The single switch 41 controlled by the armature 27 of the relay coil 25 and the pair of contacts 39—49, moreover, perform, also, the function of the switch 45 and pair of contacts 47—55 of Fig. 7, permitting the condenser 33 to charge through the resistor 43 from the rectifier 181 in one position, and to deliver energy to the relay 57, in the other. This delivery, however, is effected through still a further relay 257, shunted by a condenser 253, in a circuit traceable from the left-hand terminal of the condenser 33, through conductor 48 to and through the relay coil 57, along conductor 46 to and through the further relay 257, along conductor 44 to the contact 49, and through the switch 41 and the resistor 43 to the right-hand side of the condenser 33. It is this further relay 257 that serves as a monitor relay for checking the main load control relay 2, which is preferably of the heavy-duty type. The monitoring relay 257 is preferably of the slowly releasing type for reasons later explained.

The system-checking modification is produced, somewhat similarly to that described in connection with Fig. 7, in response to the actuation of the modifier chopping switch 21. The lamp 177 is illuminated when the switch 21 engages the contact 23 in the circuit traceable from the contact 23, that connects by conductor 80 to one side of the lamp 177, through conductor 82, resistor 175 to a contact 6, through a switch 4 actuated by the armature 10 of the main load control relay 2, to one side L1, shown fused at F1, of an alternating-current source L1—L2; thence, through the source to the side L2, back along conductor 12 and a switch 261 actuated by the monitor relay coil 257 to a contact 22, and then by conductors 16 and 18 to the other side of the lamp 177. Opening of the switch 21, therefore, extinguishes the lamp, rendering the amplifier conductive, and energizing the relay 25 to close the switch 21 again, and so on, as before explained.

It remains, now, to explain the manner in which the main load control relay 2, external to the transmission system 1, is itself monitored by the monitor relay 257. Instead of proceeding separately to identify the other components and portions of the circuit required to effect this load control relay monitoring, it will conduce to clarity to describe these components and circuit portions while setting forth the operation of this part of the device. During the chopping by the modifier switch 21, the condenser 33, as before mentioned, periodically charges and delivers energy to both condensers 53 and 253 respectively shunting the preliminary load relay 57 and the monitor relay 257. Both of the slowly de-energizable relays 57 and 257 are thus held energized during the proper operation of the system. The switch 61 of the operative relay 57 connects with contact 60, and is connected by conductor 20 to the main load control relay 2, that is also connected to the line L1. The relay 2 does not operate, however, until the resistor 175 is connected to the other side of the line, L2. The monitor relay 257, when operative, however, effects this connection of the resistor 175 through a further fuse F2 to a contact 14, and then through the switch 261 of the relay 257 and conductor 12 to the line L2. The resistor 175 prevents the operative monitor relay 257 from effecting a short-circuit between the lines L1 and L2. This resistor 175 also serves, however, as a load resistor for the fuse F2. The main load control relay 2 thus operates, causing switch 4', controlled by its armature 10, to energize the load 13 from the source L1—L2 in the circuit traceable from the left-hand side of the load through the switch 4' to the contact 24, along conductor 28 to the contact 26, and along switch 4 to the line L1, through the power source to L2, and directly to the right-hand side of the load 13. It should be noted that, in operating, the main load relay has therefore removed the previously described connection of the line L1 from the resistor 175, and has connected the line L1, rather, to the conductor 28.

Upon failure in the system, the main load control relay 2 releases before the release of the slowly de-energizable monitor relay 257. The relay releases should take place in this order to avoid a momentary short-circuit between the lines L1 and L2 that would otherwise occur through the conductor 28, unnecessarily blowing the load fuse F1. The main load control relay is thus continually monitored for proper operation since the above-described circuit containing conductor 28 will function to open the load fuse F1 if either the monitor relay 257 itself should fail or the main load control relay 2 should fail to release, as when it has become stuck. The above-described circuit containing the resistor 175, on the other hand, will function to open the control-relay-operating fuse F2 if either the monitor relay 257 should fail to release, as when the armature release spring thereof, not shown, should break, or the main load control relay 2 should fail to operate.

The absolute fail-safe features of the circuit-checking and main load-control relay-monitoring system of Fig. 13 may be summarized by the following table, indicating the reaction in the system upon the happening of certain failures.

| Failures | Reactions |
| --- | --- |
| Relay 57 fails to operate | Relay 2 will not operate. |
| Relay 257 fails to operate | Relay 2 will not operate. |
| Relay 57 fails to operate but relay 257 does operate. | Relay 257 will cause fuse F2 to open. |
| Relay 25 fails to pulsate | Relays 57, 257 and 2 will release. |
| Modulation or modification at input 5 of electronic circuit 1 not received at output 7. | Relay 25 fails to pulsate. |
| Monitoring circuits open | No light modulation. Relay 25 fails to pulsate. |
| Relay 57 fails to release | Load fuse F1 opens since relay 257 releases and closes the circuit, across L1 and L2 before the release inertia of relay 2 is overcome. |
| Relay 257 fails to release | Relay 2, in releasing, will close the circuit across L1 and L2 and open fuse F2. |
| Relay 2 fails to release | Relay 257, in releasing, will close the circuit across L1 and L2 and cause the load fuse F1 to open. |

Should it be desired to omit the load control relay monitoring system from Fig. 13, and to maintain only the system checking, this may be effected by shorting conductors 44 and 46 together and connecting conductors 18 and 82 to the lines L1 and L2. The switch 61 and the contact 60 will now become the load control contacts.

While the load-control relay monitoring is thus of particular utility in the fail-safe checking systems of the present invention, it is also of utility by itself. It may be used, for example, wherever it is desired to check the proper operation of a contactor-type relay. A somewhat modified relay monitor system is shown in Fig. 16, components thereof bearing the same numerals as the corresponding components of Fig. 13. Again it will conduce to clarity to discuss the circuit by way of an explanation of its operation. Upon the closing of low-voltage control switch S1, as for the purpose of effecting the energization of the load 13, a circuit is closed traceable from the line L2, through the load fuse F1, through conductor 12 to the contact 22, and thence through the switch 261, controlled by the monitor relay 257, through a resistor R2 and a resistor R3, to and through the monitor relay coil 257. The circuit continues through a rectifier 181 and a small resistor R4, along a conductor 102, to and across the closed switch S1, and then by a conductor 100 through a resistor R1 to a contact 6. From the contact 6 the thusly closed circuit continues through the switch 4, controlled by the armature 10 of the load control relay 2, to the other side L1 of the line. The monitor relay 257 becomes thus energized, drawing in its armature 104 and causing a further switch 106, carried thereby, to engage a contact 108. This closes a circuit for energizing the control relay 2, traceable as follows: from the upper terminal of the control relay 2 along conductor 110 to contact 108, through the switch 106, along conductor 102, through the control switch S1 and conductor 100 to fuse F2, thence through still a further switch 112, carried by the armature 104 of the monitor relay 257, to a contact 114 that connects by conductor 12 to the line L2. Since the lower terminal of the control relay 2 is connected to the line L1, the control relay 2 becomes thus energized.

Such energization of the control relay 2 connects the left-hand side of the load 13 through the switch 4', actuated by the armature 10 of the energized control relay 2, through the contact 24, conductor 28, contact 26, and the further switch 4 to L1. The right-hand side of the load 13 being permanently connected to L2, the load becomes thus energized. It will be observed that the monitor relay 257 does not release when switch 261 disconnects from the contact 22. This is because the charge stored upon the condenser 253 will momentarily hold the monitor relay 257 operated until the control relay 2 operates and actuates the switch 4 into engagement with the contact 24. When the control relay 2 becomes energized, moreover, the operating path of the monitor relay 257 becomes changed, as before explained, and the polarity of L1 and L2 is reversed with respect to the coil 257 of the monitor relay. The holding circuit for the monitor relay 257 is then traceable from the line L1 through the switch 4, the contact 26, resistor R3, the monitor relay 257, the rectifier 181, the resistor R4, conductor 102, the control switch S1, conductor 100, the fuse F2, switch 112, contact 114, and the conductor 12, to the line L2.

The various safety features of this circuit may be summarized as follows, on the basis of various assumptions of possible faults in the circuit.

Assume, first, that the control relay 2 fails mechanically to release after the control switch S1 is opened. The circuit containing R2, above mentioned, is then closed from L1, through switch 4 and contact 26 of the control relay 2, through R2, through switch 261 and contact 22 of the monitor relay 257, to L2. This increases the current through R2 until the fuse F1 opens the circuit to the load 13. Resistor R2 prevents this increase of current from damaging the relay contacts.

As previously pointed out, the monitor relay 257 operates before the control relay 2 can operate, and its operating path is through the circuit containing R2. If, therefore, continuity of this circuit does not exist, as because of dirty contacts, an open resistor R2, open wiring, or for any other reason, the load 13 cannot become energized. Thus complete continuity of this safety circuit is automatically checked every time the control is placed in operation.

If contacts 261 and 22 are stuck together when the control switch S1 is closed, the fuse F1 will blow when contact is made between the switch 4 and the contact 26 of the control relay 2. If contacts 261 and 22 are stuck in such a manner as to prevent the switch 106 from engaging the contact 108, the control relay 2 cannot operate. If the stuck contacts 261 and 22 prevent the switch 106 from engaging the contact 108, but permit 112 and 114 to close, the relay fuse F2 will blow. This is evident from the circuit traceable from L2 through 112 and 114, through the fuse F2, through R1, through contacts 6 and 4, to L1. A description of how this circuit is self-checked appears later.

If contact 26 and the switch 4 of the control relay 2 are stuck together when the control switch S1 is opened, this will release the monitor relay 257 which, in turn, will close the circuit through 261 and 22, causing F1 to open the load circuit.

If contact 24 and the switch 4' of the control relay 2 are stuck, but 4 and 6 close, the monitor relay 257 will not release when the control switch S1 is opened, and fuse F2 will blow. The circuit for holding the monitor relay 257 operated is traceable from L2, through the load 13, through stuck contacts 24 and 4', through the coil of the monitor relay 257, through the rectifier 181, through contacts 106 and 108, through the coil of the control relay 2, to L1. If contacts 24 and 4' stick, however, and also hold contacts 4 and 26 closed, then contacts 26 and 4 will shunt the coils of both relays. This is traceable from L1 through the coil of the control relay 2, through contacts 106 and 108, through the coil 257 of the monitor relay, through contacts 26 and 4, and back to L1 again. This releases the monitor relay 257 which closes the circuit and blows the fuse F1, thereby to de-energize the load 13.

A high-resistance type of relay is required for the monitor relay 257 in order to prevent the control relay 2, which may be a contactor-type relay, from operating through the coil of the monitor relay if the contacts 106 and 108 have become stuck together. While this condition does not obtain in the system of Fig. 13, since the monitor relay is there energized by a separate source, it is preferable to employ a high-resistance type of monitor relay in the system of Fig. 13, also, in order to obtain a slow release of this relay. In this connection, a slow-release alternating-current relay could also be employed in the circuit of Fig. 16, dispensing with the rectifier network 181. The above-described sequential switching operation, however, is an important feature, for failure of it to take place in proper order indicates a failure, and this, in turn, automatically prevents energizing the load 13.

Tests with working models of the systems of Figs. 13 and 16 have shown that the device is completely fail-safe in all respects, including even contact-shorting tests where welding of the contacts produces physical distortion of the other contacts on the same armature, causing them to assume unnatural positions.

It is to be understood that component substitutions and circuit variations may be effected where special applications require it, as, for example, in adapting the load-control relay monitor to operate with the transmission-system circuit checker, as shown in Fig. 13. As further examples, resistor R1 may be an adjustable resistor to provide any desired speed of blowing of the fuse F2, the breaking of contact between 112 and 114 and the release time of the monitor relay 257 may be so arranged that the slow-blowing type of fuse may be dispensed with. R1 may be replaced with a thermistor for some applications, and so on. This device, moreover, utilizes the switching properties of a fuse that is a safety link in an electrical circuit intentionally arranged to blow when a hazardous condition exists. There are many cases where uncontrolled operation of the load would be hazardous, or at least undesirable. The application of this device causes the fuse now to react both to faulty control relays as well as to hazardous load-circuit conditions.

It has before been explained that any type of signal transmission system 1 and signal source 3 may be employed in accordance with the present invention, and illustrations of several types have been given. It has also been explained that the lack of indication of the presence of the checking signal in the output 7 of the system 1 may be utilized to operate any desired control or alarm system for any desired purpose. Fig. 17 presents still a further example of still a different type of signal source and a different type of control system adapted to control and monitor an oil or other burner apparatus in accordance with the sounds accompanying the production of combustion of the oil or other fuel. To this end, a signal source 3 in the form of a sound-condition sensor microphone 400 may be placed in the vicinity of the burner chamber, not shown, properly shielded to pick up the sounds accompanying the production of combustion within the chamber when the burner motor 402 is in operation. The motor 402 may control the flow of fuel into the burner, as is well known. The operation of this sonic control system is more fully described in my copending application, Serial No. 308,661, filed September 9, 1952 for "Sonic Control for Burners," now matured as United States Letters Patent 2,767,783, issued October 23, 1956, and will be but briefly alluded to hereinafter in order to explain the operation of the circuit checking features of the present invention in connection therewith. The microphone 400 is connected in the input 5 of a first vacuum-tube or electron amplifier 404 shown comprising a plate or anode 406, a control electrode 408 and a cathode 410. The upper terminal of the microphone 400 is connected directly to the control electrode 408 and the lower terminal is connected to ground, labeled B—. The cathode 410 of the amplifier 404 is appropriately biased and decoupled through a resistance-capacitance network 412 to the ground terminal B—. Shunting the microphone 400 is an input resistor 414. The output of the amplifier 404 is fed from the plate 406 to a filter network and further amplifying stages 416. This filter network 416 and the decoupling network 412 are appropriately tuned so that particular sound frequencies peculiar to or characteristic of the sounds of combustion in a particular burner may be received to the exclusion of other sound frequencies. The condition of a certain threshold sound intensity will cause the amplifier 404 to conduct so that spurious sounds, even in the same frequency band, but of less than the threshold value will not energize the system. This is all fully explained in the said Letters Patent.

Following the further amplifying stages 416 is an output tube 418 operating as a cathode follower, the plate 420 of which is connected to the B+ terminal of the same plate supply source that furnishes plate voltage to the plate or anode 406 of the amplifier 404. The output of the further amplifying stages 416 is fed between the control electrode 422 and the cathode 424 of the output stage 418. In the cathode output circuit 7 of the output stage 418, the relay coil 25 is connected, shunted by its condenser 29. Circuit checking will be produced just as has been previously described in connection with other embodiments of the invention. The chopper switch 21 periodically connects the input circuit to the control electrode 408 of the amplifier 404 to ground, thereby cyclically rendering the microphone operative and inoperative for the feeding of signal to the input of the amplifier 404, all as before described.

When a thermostat 426 is operated to call for heat, this actuates a primary burner control 428, as more fully described in the said application, Serial No. 308,661, temporarily starting the burner motor 402. In the event that sounds accompanying proper combustion are not received by the microphone 400 in a few seconds, say, of the order of ten seconds after the starting of the burner motor 402, the primary burner control 428 will automatically shut off the burner motor 402. In the event that the proper sounds are received in the microphone 400, the load-control relay 57 will become energized to close the switch 61 into engagement with the contact 63, thereby to maintain the burner motor 402 operative. Should there be any circuit failure in the transmission system 1, in the signal source 3, in the modifier 9 or in the load control 13, as before explained, the switch 61 will open up, effecting the shutdown of the burner motor 402. Secondary controls 430, such as aquastats, thermo-safety switches and the like, may also be provided in the system, as is well known.

Other types of control apparatus may also be operated with the systems of the present invention upon the failure to recover the checking signal in the output of the transmission system 1. As an additional example, a radiation receiver system such as the sound-radiation receiving system 1 of Fig. 17, or for that matter any other type of system 1, may not only be shut down by such control apparatus upon the failure to recover the checking signal, but a duplicate standby radiation receiver, or other system, not shown, may clearly simultaneously be put in operation, if desired.

While it has before been stated that the technique underlying the invention is equally suited to mechanical transmission systems, the illustrations heretofore given have been principally electrical, electronic or electro-mechanical in nature. Figs. 14 and 15 illustrate typical mechanical embodiments of the invention. Referring to Fig. 14, there is represented a train brake system which it is desired continually and automatically to check. This particular example is generally illustrative, moreover, of any fluid checking system having a main fluid transmission line 1. In the before-mentioned brake system, the main three-way inlet actuating valve 300 may be disposed in the engine cab, and the transmission line 1 extends the length of the train with various cut-off valves 301, 302, etc. disposed therealong. Into the input 5 is fed the fluid medium from a storage supply source 3 of fluid signal. A pressure-vent line 304 provided with a check valve 303 will maintain minimum pressure in the system when the main valve 300 is opened to its vent position, and the release of the pressure-actuated devices, such as braking devices, schematically represented at 305, is desired. A modifier 9 in the form of an impulse generator, as of the acoustic-pulsation type, transmits repetitive checking impulses that modify the principal fluid pressure signal in the input 5. The same criteria, however, must hold in the mechanical case as in the electrical case, so that the checking-signal pulses produced by the impulse generator 9 must be of less pressure than that required to actuate the brakes or other pressure-actuated devices 305.

In the output 7, at the other end of the train, a diaphragm 306 is provided in a housing 307 into which the line 1 feeds. The diaphragm is adjusted to vibrate in response to the modifying impulses of the generator 9, operating through a spring 308 to oscillate a shaft 309, thereby to recover the checking signal. An armature 310 is pivotally deflected as the shaft 309 is thus oscillated causing contacts 311 and 312 alternately to engage respective further contacts 313 and 314. When the diaphragm system 306—308—309 is deformed during its synchronous response to the pressure checking pulse, recovered in the output, contacts 312 and 314 will be brought into engagement, charging the condenser C through a current-limiting resistor R from a source of energy 315. Upon the restoration of the diaphragm position, contacts 311 and 313 will be brought into engagement, delivering the energy stored in the condenser C to the slowly de-energizable load relay 57, as before discussed in connection with other embodiments of the invention. The shunt condenser 53 holds the slowly de-energizable relay 57 operated during the recovering of the repetitive checking signal in the output 7. Again, as in the electronic embodiments of the invention, the period of repetition of the checking impulses must be less than the predetermined de-energizing time interval of the relay 57.

Any failure along the transmission-line system 1 or in the fluid signal source 3, or in the modifier 9, or the output device 7, etc. will cause the relay 57 to become de-energized, closing the alarm-device contacts or other indicator. It may be observed that in this particular system, the brakes 305 are connected in parallel with respect to the main-line system 1, but series connections could also be employed. Upon application of the brake 305, moreover, the alarm will automatically sound. If this is not desired, an alarm-circuit-breaking switch could be connected to the main actuating valve 300 to prevent the alarm actuation at such times. If the alarm is permitted to operate when the brakes 305 are applied, automatic system checking of the alarm circuit will, of course, take place, thus providing checking of the entire system. A typical simple alarm circuit is illustrated in Fig. 15 embodying a lamp 316 that will be flashed on and off if the system is in proper operation, and will either be steadily on or off if a failure of any nature occurs in the fluid system under monitor or in the alarm system itself. If the feed-back type of modification is desired, this can be achieved by operating the impulse generator 9 through a pair of normally closed contacts, not shown, upon the impulse-receiver armature 310. Merely by reversing the pressure, moreover, the system of Fig. 14 may operate as a vacuum transmission system.

While in the system of Figs. 14 and 15, the brakes or other devices 305 are described as actuated by applying pressure to the system, this is for illustrative purposes only, it being understood that other well-known types of systems could also be employed with these system-checking features, including conventional balanced-pressure systems in which loss of pressure unbalances the system and the brakes or other devices are thereupon applied.

Further modifications will occur to those skilled in the art, and all such are considered to fall within the spirit and scope of the invention as defined in the appended claims.

What is claimed is:

1. A signal transmission system having parameters for the transmission of a principal signal therethrough between its input and output and arranged repetitively to modify the principal signal to produce a checking signal for monitoring the system whereby the presence of the checking signal is dependent upon the coexistence of the principal signal and its modification, the system having, in combination, means for applying the principal signal to the input, means operable during the application of the principal signal for applying to the input a modification to the principal signal of a rate or rates corresponding to a period or periods of repetition less than a predetermined time interval, thereby to produce a checking signal in the input at the said rate or rates, means for detecting the checking signal in the output, and means operable, in the event of failure to detect the checking signal for a time substantially equal to the said predetermined time interval, for thereupon indicating such failure.

2. An electrical signal transmission system having parameters for the transmission therethrough between its input and output of a principal electrical signal modified by a checking electrical signal, the system having, in combination, means for applying the principal electrical signal to the input, a relay in the output controlling a chopper switch disposed in the input and operable in response to the signal in the output for simultaneously repetitively chopping the principal electrical signal in the input at a rate or rates corresponding to a period or periods of repetition less than a predetermined time interval, in order to produce a chopping checking electrical signal that repetitively modifies the principal electrical signal in the input at the said rate or rates, means for recovering the chopping checking electrical signal from the modified electrical signal in the output, and means operable, in the event of failure to recover the chopping checking electrical signal for a time substantially equal to the said predetermined time interval, for thereupon indicating such failure.

3. An electrical signal transmission system having parameters for the transmission therethrough between its input and output of a principal electrical signal modified by a checking electrical signal, the system having, in combination, means for applying the principal electrical signal to the input, a relay in the output controlling a chopper switch disposed in the input and operable in response to the signal in the output for simultaneously repetitively chopping the principal electrical signal in the input at a rate or rates corresponding to a period or periods of repetition less than a predetermined time interval, in order to produce a chopping checking electrical signal that repetitively modifies the principal electrical signal in the input at the said rate or rates, further switching means, means for operating the further switching means in response to the modified electrical signal in the output to recover the chopping checking electrical signal from the modified electrical signal in the output, and means operable, in the event of the failure of the further switching means to recover the chopping checking electrical signal for a time substantially equal to the said predetermined time interval, for thereupon indicating such failure.

4. An electrical signal transmission system having parameters for the transmission therethrough between its input and output of a principal electrical signal modified by a checking electrical signal, the system having, in combination, means for applying the principal electrical signal to the input, a relay in the output controlling a chopper switch disposed in the input and operable in response to the signal in the output for simultaneously repetitively chopping the principal electrical signal in the input at a rate or rates corresponding to a period or periods of repetition less than a predetermined time interval, in order to produce a chopping checking electrical signal that repetitively modifies the principal electrical signal in the input at the said rate or rates, a source of energy, a load, further switching means disposed between the source of energy and the load, means for operating the further switching means in response to the modified electrical signal in the output to recover the chopping checking electrical signal from the modified electrical signal in the output in order repetitively to feed energy from the source to the load during the cycle of the chopping, and means operable, in the event of the failure of the further switching means to recover the chopping checking electrical signal for a time substantially equal to the said predetermined time interval, for thereupon indicating such failure.

5. An electrical transmission system having parameters for the transmission therethrough between its input and output of a principal electrical signal modified by a checking electrical signal, the system having, in combination, means for applying the principal electrical signal to the input, a relay in the output controlling a chopper switch disposed in the input and operable in response to the signal in the output for simultaneously repetitively chopping the principal electrical signal in the input at a rate or rates corresponding to a period or periods of repetition less than a predetermined time interval, in order to produce a chopping checking electrical signal that repetitively modifies the principal electrical signal in the input at the said rate or rates, a source of energy, a load, further switching means disposed between the source of energy and the load, means for operating the further switching means in response to the modified electrical signal in the output to recover the chopping checking electrical signal from the modified electrical signal in the output in order to feed energy from the source to the load at the time of the said chopping only, and means associated with the load and operable, in the event of the failure of the further switching means to recover the chopping checking electrical signal for a time substantially equal to the said predetermined time interval, for thereupon indicating such failure.

6. An electrical signal transmission system having parameters for the transmission therethrough between its input and output of a principal electrical signal modified by a checking electrical signal, the system having, in combination, means for applying the principal electrical signal to the input, a relay in the output controlling a chopper switch disposed in the input and operable in response to the signal in the output for simultaneously repetitively chopping the principal electrical signal in the input at a rate or rates corresponding to a period or periods of repetition less than a predetermined time interval, in order to produce a chopping checking electrical signal that repetitively modifies the principal electrical signal in the input at the said rate or rates, a source of energy, a load, energy storage means, further switching means disposed between the energy storage means and the source of energy and between the energy storage means and the load, means for operating the further switching means in response to the modified electrical signal in the output to recover the chopping checking electrical signal from the modified electrical signal in the output in order repetitively to store energy from the source of energy in the energy storage means and to deliver the stored energy from the energy storage means to the load during the cycle of the chopping, and means associated with the load and operable, in the event of the failure of the further switching means to recover the chopping checking electrical signal for a time substantially equal to the said predetermined time interval, for thereupon indicating such failure.

7. An electrical signal transmission system having parameters for the transmission therethrough between its input and output of a principal electrical signal modified by a checking electrical signal, the system having, in combination, means for applying the principal electrical signal to the input, a relay in the output controlling a chopper switch disposed in the input and operable in response to the signal in the output for simultaneously repetitively chopping the principal electrical signal in the input at a rate or rates corresponding to a period or periods of repetition less than a predetermined time interval, in order to produce a chopping checking electrical signal that repetitively modifies the principal electrical signal in the input at the said rate or rates, a source of energy, a load, energy storage means, further switching means for connecting the energy storage means to the source of energy in one position in order to store energy therefrom and for connecting the energy storage means to the load in another position in order to deliver the stored energy to the load, means for operating the further switching means in response to the modified electrical signal in the output to recover the chopping checking electrical signal from the modified electrical signal in the output in order to deliver stored energy from the energy storage means to the load at the time of the said chopping only, and means associated with the load and operable, in the event of the failure of the further switching means to recover the chopping checking electrical signal for a time substantially equal to the said predetermined time interval, for thereupon indicating such failure.

8. An electrical signal transmission system having parameters for the transmission therethrough between its input and output of a principal electrical signal modified by a checking electrical signal, the system having, in combination, means for applying the principal electrical signal to the input, a relay in the output controlling a chopper switch disposed in the input and operable in response to the signal in the output for simultaneously repetitively chopping the principal electrical signal in the input at a rate or rates corresponding to a period or periods of repetition less than a predetermined time interval, in order to produce a chopping checking electrical signal that repetitively modifies the principal electrical signal in the input at the said rate or rates, a source of energy, a load, energy storage means, further switching means for connecting the energy storage means to the source of energy in one position in order to store energy therefrom and for connecting the energy storage means to the load in another position in order to deliver the stored energy to the load, means for operating the further switching means in response to the modified electrical signal in the output to recover the chopping checking electrical signal from the modified electrical signal in the output in order to deliver stored energy from the energy storage means to the load at a time when the chopping has ceased, and means associated with the load and operable, in the event of the failure of the further switching means to recover the chopping checking electrical signal for a time substantially equal to the said predetermined time interval, for thereupon indicating such failure.

9. An electrical signal transmission system having parameters for the transmission therethrough between its input and output of a principal electrical signal modified by a checking electrical signal, the system having, in combination, means for applying the principal electrical signal to the input, a relay in the output having an armature controlling a chopper switch disposed in the input and operable in response to the signal in the relay for simultaneously repetitively chopping the principal electrical signal in the input at a rate corresponding to a period of repetition less than a predetermined time interval, in order to produce a chopping checking electrical signal that repetitively modifies the principal electrical signal in the input at the said rate, further switching means, means for operating the further switching means under the control of the said armature in response to the modified electrical signal in the relay to reproduce from and thereby to recover from the modified electrical signal in the relay, the chopping checking electrical signal, and means operable, in the event of the failure of the further switching means to recover the chopping checking electrical signal for a time substantially equal to the said predetermined time interval, for thereupon indicating such failure.

10. An electrical signal transmission system having parameters for the transmission therethrough between its input and output of a principal electrical signal modified by a checking electrical signal, the system having, in combination, means for applying the principal electrical signal to the input, a relay in the output having an armature controlling a chopper switch disposed in the input and operable in response to the signal in the relay for simultaneously repetitively chopping the principal electrical signal in the input at a rate corresponding to a period of repetition less than a predetermined time interval, in order to produce a chopping checking electrical signal that repetitively modifies the principal electrical signal in the input at the said rate, a source of energy, a load, energy storage means, further switching means for connecting the energy storage means to the source of energy in one position in order to store energy therefrom and for connecting the energy storage means to the load in another position in order to deliver the stored energy to the load, means for operating the further switching means under the control of the said armature in response to the modified electrical signal in the output relay to reproduce from and thereby to recover from the modified electrical signal in the output relay the chopping checking electrical signal in order to deliver energy from the energy storage means to the load at the time of the said chopping only, and means associated with the load and operable, in the event of the failure of the further switching means to recover the chopping checking electrical signal for a time substantially equal to the said predetermined time interval, for thereupon indicating such failure.

11. An electrical signal transmission system having parameters for the transmission therethrough between its input and output of a principal electrical signal modified by a checking electrical signal, the system having, in combination, means for applying the principal electrical signal to the input, a relay in the output having an armature controlling a chopper switch disposed in the input and operable in response to the signal in the relay for simultaneously repetitively chopping the principal electrical signal in the input at a rate corresponding to a period of repetition less than a predetermined time interval, in order to produce a chopping checking electrical signal that repetitively modifies the principal electrical signal in the input at the said rate, a source of energy, a slowly responding load adapted to respond in a period of time equal to or greater than the said predetermined time interval, energy storage means, further switching means for connecting the energy storage means to the source of energy in one position in order to store energy therefrom and for connecting the energy storage means to the load in another position in order to deliver the stored energy to the load, means for operating the further switching means under the control of the said armature in response to the modified electrical signal in the output relay to reproduce from and thereby to recover from the modified electrical signal in the output relay the chopping checking electrical signal in order to deliver energy from the energy storage means to the load at the time of the said chopping only, whereby the slowly responding load remains energized, and means associated with the load and operable, in the event of the failure of the further switching means to recover the chopping checking electrical signal for a time substantially equal to the said predetermined time interval, for thereupon indicating such failure.

12. An electrical signal transmission system having parameters for the transmission therethrough between its input and output of a principal electrical signal modified by a checking electrical signal, the system having, in combination, means for applying the principal electrical signal to the input, a relay in the output having an armature controlling a chopper switch disposed in the input and operable in response to the signal in the relay for simultaneously repetitively chopping the principal electrical signal in the input at a rate corresponding to a period of repetition less than a predetermined time interval, in order to produce a chopping checking electrical signal that repetitively modifies the principal electrical signal in the input at the said rate, a source of energy, a slowly de-energizable load comprising a further relay adapted to de-energize in a period of time equal to or greater than the said predetermined time interval, energy storage means, further switching means for connecting the energy storage means to the source of energy in one position in order to store energy therefrom and for connecting the energy storage means to the load in another position in order to deliver the stored energy to the load, means for operating the further switching means under the control of the said armature in response to the modified electrical signal in the output relay to reproduce from and thereby to recover from the modified electrical signal in the output relay the chopping checking electrical signal in order to deliver energy from the energy storage means to the load at the time of the said chopping only, whereby the slowly de-energizable load remains energized, and means associated with the load and operable, in the event of the failure of the further switching means to recover the chopping checking electrical signal for a time substantially equal to the said predetermined time interval, for thereupon indicating such failure.

13. An electrical signal transmission system having parameters for the transmission therethrough between its input and output of a principal electrical signal modified by a checking electrical signal, the system having, in combination, means for applying the principal electrical signal to the input, a relay in the output having an armature controlling a chopper switch disposed in the input and operable in response to the signal in the relay for simultaneously repetitively chopping the principal electrical signal in the input at a rate corresponding to a period of repetition less than a predetermined time interval, in order to produce a chopping checking electrical signal that repetitively modifies the principal electrical signal in the input at the said rate, a first source of energy, a further slowly de-energizable relay adapted to de-energize in a period of time equal to or greater than the said predetermined time interval, energy storage means, a second switching means for connecting the energy storage means to the source of energy in one position in order to store energy therefrom and for connecting the energy storage means to the further slowly de-energizable relay in another position in order to deliver the stored energy to the load, means for operating the second switching means under the control of the said armature in response to the modified electrical signal in the output relay to reproduce from and thereby to recover from the modified electrical signal in the output relay the chopping checking electrical signal in order to deliver energy from the energy storage means to the further slowly de-energizable relay at the time of the said chopping only, whereby the further slowly de-energizable relay remains energized, a second source of energy, a load, a third switching means connected between the second source of energy and the load, and means for operating the third switching means upon the de-energization of the further slowly de-energizable relay to indicate in the load failure of the further switching means to recover the chopping checking electrical signal for a time substantially equal to the said predetermined time interval.

14. A condition-monitor system having parameters for the transmission therethrough between its input and output of a condition-monitoring signal modified by a checking signal of at least a predetermined magnitude, the system having, in combination, a condition-monitor device for producing a condition-monitoring signal in the presence of the condition, means for applying the condition-monitoring signal to the input, means operable during the application of the condition-monitoring signal for applying to the input a repetitive checking signal of at least the predetermined magnitude and of a rate or rates corresponding to a period or periods of repetition less than a predetermined time interval, in order repetitively to modify the condition-monitoring signal in the input at the said rate or rates, means for recovering the checking signal from the modified signal in the output, and means operable, in the event of failure to recover the checking signal for a time substantially equal to the said predetermined time interval, for thereupon indicating such failure.

15. A condition-monitor system having parameters for the transmission therethrough between its input and output of a condition-monitoring signal modified by a checking signal, the system having, in combination, a condition-monitor device for producing a condition-monitoring signal in the presence of the condition, means for applying the condition-monitoring signal to the input, means operable in response to the signal in the output for simultaneously repetitively reacting upon the condition-monitoring signal in the input at a rate corresponding to a period of repetition less than a predetermined time interval, in order to produce a checking signal that repetitively modifies the condition-monitoring signal in the input at the said rate, means for recovering the checking signal from the modified signal in the output, and means operable, in the event of failure to recover the checking signal for a time substantially equal to the said predetermined time interval, for thereupon indicating such failure.

16. A flame-monitor system having parameters for the transmission therethrough between its input and output of a flame-monitoring signal modified by a checking signal, the system having, in combination, a flame-monitor device for producing a flame-monitoring signal in the presence of a flame, means for applying the flame-monitoring signal to the input, a relay in the output controlling a chopper switch disposed in the input and operable in response to the signal in the output for simultaneously repetitively chopping the flame-monitoring signal in the input at a rate corresponding to a period of repetition less than a predetermined time interval, in order to produce a chopping checking signal that repetitively modifies the flame-monitoring signal in the input at the said rate, means for recovering the chopping checking signal from the modified signal in the output, and means operable, in the event of failure to recover the chopping checking signal for a time substantially equal to the said predetermined time interval, for thereupon indicating such failure.

17. A flame-monitor system having parameters for the transmission therethrough between its input and output of a flame-monitoring signal modified by a checking signal, the system having, in combination, a flame-monitor device for producing a flame-monitoring signal in the presence of a flame, means for applying the flame-monitoring signal to the input, a relay in the output controlling a chopper switch disposed in the input and operable in response to the signal in the output for simultaneously repetitively chopping the flame-monitoring signal in the input at a rate corresponding to a period of repetition less than a predetermined time interval, in order to produce a chopping checking signal that repetitively modifies the flame-monitoring signal in the input at the said rate, a source of energy, a load, further switching means disposed between the source of energy and the load, means for operating the further switching means in response to the modified signal in the output to recover the chopping checking signal from the modified signal in the output in order repetitively to feed energy from the source to the load during the cycle of the chopping, and means operable, in the event of the failure of the further switching means to recover the chopping checking signal for a time substantially equal to the said predetermined time interval, for thereupon indicating such failure.

18. A flame-monitor system having parameters for the transmission therethrough between its input and output of a flame-monitoring signal modified by a checking signal, the system having, in combination, a flame-monitor device for producing a flame-monitoring signal in the presence of a flame, means for applying the flame-monitoring signal to the input, a relay in the output controlling a chopper switch disposed in the input and operable in response to the signal in the output for simultaneously repetitively chopping the flame-monitoring signal in the input at a rate corresponding to a period of repetition less than a predetermined time interval, in order to produce a chopping checking signal that repetitively modifies the flame-monitoring signal in the input at the said rate, a source of energy, a load, energy storage means, further switching means disposed between the energy storage means and the source of energy and between the energy storage means and the load, means for operating the further switching means in response to the modified signal in the output to recover the chopping checking signal from the modified signal in the output in order repetitively to store energy from the source of energy in the energy storage means and to deliver the stored energy from the energy storage means to the load during the cycle of the chopping, and means associated with the load and operable, in the event of the failure of the further switching means to recover the chopping checking signal for a time substantially equal to the said predetermined time interval, for thereupon indicating such failure.

19. A flame-monitor system having parameters for the transmission therethrough of a flame-monitoring signal modified by a checking signal, the system having, in combination, a normally conductive amplifier having an input and an output, a flame-monitor device adapted to produce a flame-monitoring signal in the presence of a flame, means for applying the flame-monitoring signal to the input to render the amplifier non-conductive only when the signal is so applied, a relay in the output responsive to the conduction and non-conduction of the amplifier, a chopper switch disposed in the input, the relay controlling the chopper switch to actuate it between positions where the flame-monitor signal may and may not be applied to the input repetitively at a rate corresponding to a period of repetition less than a predetermined time interval, in order to produce a chopping checking signal that repetitively modifies the flame-monitoring signal in the input at the said rate, means for recovering the chopping checking signal from the modified signal in the output, and means operable, in the event of failure to recover the chopping checking signal for a time substantially equal to the said predetermined time interval, for thereupon indicating such failure.

20. A flame-monitor system having parameters for the transmission therethrough of a flame-monitoring signal modified by a checking signal, the system having, in combination, a normally conductive amplifier having an input and an output, a flame-monitor device adapted to produce a flame-monitoring signal in the presence of a flame, means for applying the flame-monitoring signal to the input to render the amplifier non-conductive only when the signal is so applied, a relay in the output responsive to the conduction and non-conduction of the amplifier, a chopper switch disposed in the input, the relay controlling the chopper switch to actuate it between positions where the flame-monitor signal may and may not be applied to the input repetitively at a rate corresponding to a period of repetition less than a predetermined time interval, in order to produce a chopping checking signal that repetitively modifies the flame-monitoring signal in the input at the said rate, a source of energy, a load, further switching means disposed between the source of energy and the load, means for operating the further switching means in response to the modified signal in the output to recover the chopping checking signal from the modified signal in the output in order repetitively to feed energy from the source to the load during the cycle of the chopping, and means operable, in the event of the failure of the further switching means to recover the chopping checking signal for a time substantially equal to the said predetermined time interval, for thereupon indicating such failure.

21. A flame-monitor system having parameters for the transmission therethrough of a flame-monitoring signal modified by a checking signal, the system having, in combination, a normally conductive amplifier having an input and an output, a flame-monitor device adapted to produce a flame-monitoring signal in the presence of a flame, means for applying the flame-monitoring signal to the input to render the amplifier non-conductive only when the signal is so applied, a relay in the output responsive to the conduction and non-conduction of the amplifier, a chopper switch disposed in the input, the relay controlling the chopper switch to actuate it between positions where the flame-monitor signal may and may not be applied to the input repetitively at a rate corresponding to a period of repetition less than a predetermined time interval, in order to produce a chopping checking signal that repetitively modifies the flame-monitor signal in the input at the said rate, further switching means, means for operating the further switching means under the control of the said relay in response to the modified signal in the output to reproduce from and thereby to recover from the modified signal in the output the chopping checking signal, and means operable, in the event of the failure of the further switching means to recover the chopping checking signal for a time substantially equal to the said predetermined time interval, for thereupon indicating such failure.

22. A flame-monitor system having parameters for the transmission therethrough of a flame-monitoring signal modified by a checking signal, the system having, in combination, a normally conductive amplifier having an input and an output, a flame-monitor device adapted to produce a flame-monitoring signal in the presence of a flame, means for applying the flame-monitoring signal to the input to render the amplifier non-conductive only when the signal is so applied, a relay in the output responsive to the conduction and non-conduction of the amplifier, a chopper switch disposed in the input, the relay controlling the chopper switch to actuate it between positions where the flame-monitor signal may and may not be applied to the input repetitively at a rate corresponding to a period of repetition less than a predetermined time interval, in order to produce a chopping checking signal that repetitively modifies the flame-monitoring signal in the input at the said rate, a source of energy, a slowly de-energizable load comprising a further relay adapted to de-energize in a period of time equal to or greater than the said predetermined time interval, energy storage means, further switching means connecting the energy storage means to the source of energy in one position in order to store energy therefrom and for connecting the energy storage means to the load in another position in order to deliver the stored energy to the load, means for operating the further switching means under the control of the output relay in response to the modified signal in the output to reproduce from and thereby to recover from the modified signal in the output the chopping checking signal in order to deliver energy from the energy storage means to the load at the time of the said chopping only, whereby the slowly de-energizable load remains energized, and means associated with the load and operable, in the event of the failure of the further switching means to recover the chopping checking signal for a time substantially equal to the said predetermined time interval, for thereupon indicating such failure.

23. A flame-monitor system having parameters for the transmission therethrough of a flame-monitoring signal modified by a checking signal, the system having, in combination, a normally conductive amplifier having an input and an output, a pilot-flame-monitor device having a gas pilot-burner housing provided with an igniter electrode and a probe electrode disposed in the space occupied by the pilot flame, a high-voltage source connected between the igniter electrode and the housing to ignite the gas in the housing to produce the pilot flame, electrical connections between the electrodes for developing a flame-monitoring signal in the presence of the flame, means for applying the flame-monitoring signal to the input to render the amplifier non-conductive only when the signal is so applied, a relay in the output responsive to the conduction and non-conduction of the amplifier, a chopper switch disposed in the input, the relay controlling the chopper switch to actuate it between positions where the flame-monitor signal may and may not be applied to the input repetitively at a rate corresponding to a period of repetition less than a predetermined time interval, in order to produce a chopping checking signal that repetitively modifies the flame-monitoring signal in the input at the said rate, a source of energy, a slowly de-energizable load comprising a further relay adapted to de-energize in a period of time equal to or greater than the said predetermined time interval, energy storage means, further switching means connecting the energy storage means to the source of energy in one position in order to store energy therefrom and for connecting the energy storage means to the load in another position in order to deliver the stored energy to the load, means for operating the further switching means under the control of the output relay in response to the modified signal in the output to reproduce from and thereby to recover from the modified signal in the output the chopping checking signal in order to deliver energy from the energy storage means to the load at the time of the said chopping only, whereby the slowly de-energizable load remains energized, and means associated with the load and operable, in the event of the failure of the further switching means to recover the chopping checking signal for a time substantially equal to the said predetermined time interval, for thereupon indicating such failure.

24. In a signal transmission system having parameters for the transmission therethrough between its input and output of a principal signal modified by a checking signal, apparatus of the character described that comprises means for applying the principal signal to the input, means for repetitively reacting upon the principal signal in the input in accordance with the signal in the output at a rate or rates corresponding to a period or periods of repetition less than a predetermined time interval, in order repetitively to modify the principal signal in the input at the said rate or rates, the modification serving as a checking signal, means for recovering the checking signal from the modified signal in the output, means for responding to a failure to recover the checking signal for a time substantially equal to the said predetermined time interval, and means for thereupon indicating such failure.

25. Apparatus of the character described that comprises means for applying a principal signal to the input of a signal transmission system in order to transmit the principal signal to the output thereof, means for repetitively modifying the principal signal in the input in accordance with a distinctive characteristic not otherwise reproduceable in the system to produce a checking signal whereby the presence of the said checking signal is dependent upon the co-existence of the principal signal and its modification, means for detecting the checking signal in the output and means for rendering a load effective in the output, and rendering a load effective in response to the detection of the said checking signal.

26. Apparatus of the character described that comprises means for applying a signal to the input of a signal transmission system in order to transmit the signal to the output thereof, means for feeding the signal in the output to modify the signal in the input, means for responding to the thusly modified signal in the output to cease modification of the signal in the input, means for thereupon causing the unmodified signal resulting in the output to modify the signal in the input again, thereby to produce a periodic modification of the signal in the input in accordance with a distinctive characteristic not otherwise reproduceable in the system, correspondingly to produce a corresponding periodic modification in the output, and means for indicating the cessation of the said periodic modification in the output.

27. Electrical apparatus of the character described that comprises means for applying a principal signal to the input of a signal transmission system in order to transmit the principal signal to the output thereof, means for repetitively modifying the principal signal in the input in accordance with a distinctive characteristic not otherwise reproduceable in the system to produce a checking signal whereby the presence of the said checking signal is dependent upon the co-existence of the principal signal and its modification, means for detecting the checking signal in the output, and means for rendering a load effective in response to the detection of the said checking signal.

28. A condition-monitor system as claimed in claim 14 and in which the said output, comprising the said recovering means, is tuned selectively to respond to the said repetition rate or rates.

29. A condition-monitor system as claimed in claim 14 and in which the said recovering means comprises a relay having a high alternating-current impedance.

30. A condition-monitor system as claimed in claim 14 and in which the said recovering means comprises a transformer adapted to provide high response to frequencies of the said repetition rate or rates.

31. A system for monitoring an externally repetitively modified event-to-be-detected the repetitive modification of which occurs at a rate or rates corresponding to a period or periods of repetition less than a predetermined time interval, the system having parameters for the transmission therethrough between its input and output of a corresponding repetitively modified signal of at least a predetermined magnitude and of the said rate or rates, the system having, in combination, an event-detecting device for producing, in the presence of the repetitively modified event, a corresponding repetitive modified signal of at least the said predetermined magnitude and of the said rate or rates, means for applying the repetitively modified signal to the input, means for recovering the repetitive modification of the modified signal in the output, and means operable, in the event of failure to recover the repetitive modification for a time substantially equal to the said predetermined time interval, for thereupon indicating such failure.

32. A condition detector comprising: a first electron discharge device having an input and an output, an electrically operable condition sensor, means connecting said condition sensor to the input of said first discharge device in a manner to control the conduction of said first discharge device, a second electron discharge device having an input and an output, means connecting the output of said first discharge device to the input of said second discharge device to control the conduction of said second discharge device, and means including the output of said second discharge device to control the operativeness of said condition sensor to render said condition sensor cyclically operative and then inoperative upon said condition sensor being subjected to a condition to be detected.

33. A flame detector comprising: a first electron discharge device having an input and an output, an electrically operable flame sensor, means connecting said flame sensor to the input of said first discharge device in a manner to control the conduction of said first discharge device, a second electron discharge device having an input and an output, means connecting the output of said first discharge device to the input of said second discharge device to control the conduction of said second discharge device, means including the output of said second discharge device to control the operativeness of said flame sensor to render said flame sensor cyclically operative and then inoperative upon said flame sensor being subjected to a flame, a means responsive to and operative upon said flame sensor cyclically sensing flame when operative and then sensing the absence of flame when inoperative.

References Cited in the file of this patent

UNITED STATES PATENTS

| | | |
|---|---|---|
| 2,605,334 | Hines | July 29, 1952 |
| 2,643,370 | Lawrence | June 23, 1953 |
| 2,659,880 | Dodd | Nov. 17, 1953 |
| 2,695,399 | Martin | Nov. 23, 1954 |
| 2,703,877 | Staff et al. | Mar. 8, 1955 |